United States Patent
Guan et al.

(10) Patent No.: US 7,477,426 B2
(45) Date of Patent: Jan. 13, 2009

(54) IMAGE CORRECTING APPARATUS AND METHOD, PROGRAM, STORAGE MEDIUM, IMAGE READING APPARATUS, AND IMAGE FORMING APPARATUS

(75) Inventors: Haike Guan, Tokyo (JP); Tadashi Araki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1109 days.

(21) Appl. No.: 10/359,238

(22) Filed: Feb. 6, 2003

(65) Prior Publication Data
US 2003/0198398 A1 Oct. 23, 2003

(30) Foreign Application Priority Data
Feb. 8, 2002 (JP) .............................. 2002-033092
Nov. 14, 2002 (JP) .............................. 2002-330362

(51) Int. Cl.
*H04N 1/04* (2006.01)
(52) U.S. Cl. .................. 358/474; 358/1.2; 358/1.9; 382/199; 382/176; 399/187; 355/25
(58) Field of Classification Search ................ 358/474, 358/1.2, 1.9, 504, 488, 505, 449–464; 382/199, 382/176, 285, 286, 256; 399/187, 362; 355/25
See application file for complete search history.

(56) References Cited

U.S. PATENT DOCUMENTS

| | | | | |
|---|---|---|---|---|
| 5,583,662 A | * | 12/1996 | Takahashi et al. | ............ 358/474 |
| 5,726,775 A | * | 3/1998 | Walsh | ......................... 358/488 |
| 5,808,756 A | * | 9/1998 | Matsuda | ...................... 358/474 |
| 5,987,163 A | * | 11/1999 | Matsuda | ...................... 382/154 |
| 6,097,483 A | * | 8/2000 | Komatsu | .................. 356/237.2 |
| 6,433,896 B1 | * | 8/2002 | Ueda et al. | .................... 358/488 |
| 6,954,290 B1 | * | 10/2005 | Braudaway et al. | ........ 358/3.26 |
| 2002/0022898 A1 | | 2/2002 | Araki | |

FOREIGN PATENT DOCUMENTS

JP 05-161002 6/1993
JP 11-041455 2/1999

OTHER PUBLICATIONS

U.S. Appl. No. 09/633,290.
Toshikazu Wada, et al., "Shape from Shading with Interreflections Under a Proximal Light Source: Distortion-Free Copying of an Unfolded Book", International Journal of Computer Vision 24(2), 125-135 (1997).

* cited by examiner

*Primary Examiner*—Edward Coles
*Assistant Examiner*—Negussie Worku
(74) *Attorney, Agent, or Firm*—Dickstein Shapiro LLP

(57) ABSTRACT

An image correcting apparatus is provided for preventing a degraded image quality which can be caused by a three-dimensional distortion correction made to a scanned image distorted in a trapezoidal shape. Divergent distortion angles α, β of a scanned image are detected using a page contour of a book document which can be found near the upper or lower edge of the scanned image in a main scanning direction. The scanned image is corrected for a divergent distortion based on the divergent distortion angles α, β, followed by a correction of the scanned image for a shape distortion in a sub-scanning direction. In this way, the image quality can be prevented from degradation possibly caused by the three-dimensional distortion correction, if made to such a scanned image distorted in a trapezoidal shape.

23 Claims, 27 Drawing Sheets

MAIN SCANNING DIRECTION

Windows™40ABCDEFGHI*JKL=MNZOP#QRS=TUVW%XYZABCDE

HORIZONTALLY DRAWN RULES

IMAGE CORRECTING APPARATUS AND METHOD, PROGRAM, STORAGE MEDIUM, IMAGE READING APPARATUS, AND IMAGE FORMING APPARATUS

BACKGROUND OF THE INVENTION

1. Field of the Invention

The present invention relates to an image correcting apparatus and method which can correct a scanned image distorted in a trapezoidal shape for a three-dimensional distortion correction made without causing a degraded image quality, a program for implementing the image correcting apparatus in a computer, a storage medium which has the program stored thereon, and an image reading apparatus and an image forming apparatus which incorporate the image correcting apparatus.

2. Description of the Related Art

A flat bed scanner typically reads flat sheet documents. Specifically, the flat bed scanner comprises a contact glass and a pivotable pressure plate disposed over the contact glass. After a document sheet is carried on the contact glass, the pressure plate is closed for scanning the document sheet. However, documents intended for scanning are not limited to such flat sheet ones, but certain pages in a book document can be subjected to scanning, in which case the book document is opened at intended pages that are placed on the contact glass for scanning.

However, as illustrated in FIG. 39, when a book 100 opened at certain pages is placed on a contact glass 102 for scanning, a binding margin 101 of the book document 100 cannot be brought into contact with the contact glass 102. When the binding margin 101 of the book document 100 rises above the contact glass 102, the binding margin 101 is away from a focal point of the scanner, so that the scanned image is distorted, shadowed, blurred, or otherwise deteriorated in the rising binding margin 101. The deteriorated image of the binding margin 101 is not readily readable and causes an extremely low recognition rate when characters on the image are recognized through an optical character reading (OCR) process. This is particularly true with a relatively thick book. In addition, when the operator presses the binding margin 101 of the book document 100 against the contact glass 102 to maintain the binding margin 101 on the focal plane, the book document 100 itself can be damaged.

To solve the foregoing problem, a method of correcting a distorted image involves estimating a three-dimensional shape of an object from information on the density on an image. A typical example of such a method of estimating a three-dimensional shape of an object from image density information is Shape from Shading, for example, as disclosed in T. Wada, H. Uchida and T. Matsuyama, "Shape from Shading with Interreflections under a Proximal Light Source: Distortion-free Copying of an Unfolded Book," International Journal Computer Vision 24 (2), pp.125-135 (1997) (hereinafter called "Reference 1").

However, the Shape from Shading method is not feasible because of a large amount of calculations and a long calculation time required for correcting distortions.

Laid-open Japanese Patent Application No. 5-161002 (hereinafter called "Reference 2") in turn relies on triangulation to measure the shape of a book. However, the method described in Reference 2 is not proper because it requires a special shape measuring device for measuring the shape of a book in accordance with the triangulation.

In recent years, an image correcting apparatus has been proposed for estimating a three-dimensional shape of a book using the contour of the spread book in a read or scanned image to effectively correct distortions with a less amount of calculations (for example, see Laid-open Japanese Patent Application No. 11-41455).

When a book document is set on a contact glass, the book document must be placed with its image facing the contact glass, so that the operator can see only the cover of the book document. Since the operator cannot confirm how the book document is placed, a resulting scanned image a could diverge downwardly (hereinafter such a distortion is called the "divergent distortion") because the binding margin of the book document rises above the contact glass by different amounts along its upper and lower edges, as illustrated in FIG. 40.

However, since conventional image correcting methods do not take into account the foregoing situation, they are not capable of sufficiently correcting the foregoing distortions in a scanned image, and moreover cause a lower image quality on the contrary.

SUMMARY OF THE INVENTION

It is therefore an object of the present invention to provide an image correcting apparatus and method which are capable of correcting a scanned image having a divergent distortion for three-dimensional shape distortions while preventing a degraded image quality associated with the distortion correction.

It is another object of the present invention to provide a program for causing a computer to implement the image correcting apparatus, a storage medium which has the program stored thereon, and an image reading apparatus which incorporates the image correcting apparatus for reading an image corrected for distortions, and an image forming apparatus which incorporates the image correcting apparatus for forming an image corrected for distortions.

To achieve the above object, according to a first aspect, the present invention provides an image correcting apparatus for correcting a scanned image of a book document in contact with a contact glass of a scanner, read by image reading means. The image correcting apparatus includes divergent angle detecting means for detecting a divergent angle of the scanned image using a linear portion included in the scanned image of the book document, and divergent distortion correcting means for correcting the scanned image for a divergent distortion based on the divergent distortion angle detected by the divergent distortion angle detecting means and subsequently correcting the scanned image for a shape distortion in a sub-scanning direction.

As described above, the divergent angle of the scanned image is detected using the linear portion included in the scanned image of the book document, and the scanned image is corrected for a divergent distortion based on the divergent distortion angle, and subsequently the scanned image is corrected for a shape distortion in the sub-scanning direction. In this way, the image quality can be prevented from degradation possibly caused by the three-dimensional distortion correction, if made to a scanned image distorted in a trapezoidal shapes.

In the image correcting apparatus set forth above, the divergent angle detecting means includes distortion region estimating means for detecting a straight section of the linear portion from each of a left and a right page of the scanned image, and detecting a boundary point between the straight section and a curvilinear section of the linear portion to estimate a distortion region, and divergent distortion angle calculating means for calculating an angle formed by the straight section and the sub-scanning direction on each of the left and right pages of the scanned image.

As described above, the divergent distortion angles are calculated based on the angles formed by the straight sections of the linear portions on each of the left and right pages of the scanned image and the sub-scanning direction in which the book document is scanned. Since the divergent distortion angles are calculated only by detecting the straight sections of the linear portions, which are boundaries with the distortion region, the divergent distortion angles can be detected in a shorter time.

In the image correcting apparatus set forth above, the divergent distortion correcting means includes three-dimensional shape detecting means for detecting a three-dimensional shape of the book document, main scanning direction distortion correcting means for spreading the scanned image in a main scanning direction based on the three-dimensional shape of the book document detected by the three-dimensional shape detecting means, image rotating means for dividing the scanned image spread by the main scanning direction distortion correcting means into a left and a right page, and rotating the left and right pages respectively about predetermined positions by the divergent distortion angles detected by the divergent distortion angle detecting means, and sub-scanning direction distortion correcting means for spreading the left and right pages in the sub-scanning direction based on the three-dimensional shape of the images rotated by the image rotating means.

In the foregoing configuration, the scanned image can be corrected without fail for the shape distortion in the sub-scanning direction after correcting the scanned image for the divergent distortion.

In the image correcting apparatus set forth above, the three-dimensional shape detecting means includes rising level detecting means for detecting a rising level of the book document from the contact glass based on the distance from a line extended from the straight sections on the left and right pages of the scanned image to a boundary in a binding margin to the curvilinear section of the linear portion, and linear interpolating means for selecting two rising levels for each column on lines parallel with the boundary in the binding margin to perform linear interpolation for each column on the lines based on the two rising levels.

The foregoing configuration can ensure that the three-dimensional shape of the book document is detected.

In the image correcting apparatus set forth above, the rising level detecting means estimates a boundary between the distortion region in which the book document rises over the contact glass and a region out of the distortion region, and sets the rising level at the boundary to zero.

The foregoing configuration facilitates the detection of the rising level of the book document from the contact glass.

In the image correcting apparatus set forth above, the divergent distortion correcting means includes pixel linear interpolating means for performing linear interpolation based on pixel values of four adjoining blocks for each pixel value of the scanned image rotated by the image rotating means.

In the foregoing configuration, the image corrected by rotating the divided left and right pages of the scanned image will not result in fractional coordinates of pixels. In this way, the image quality can be maintained for the image corrected for the divergent correction.

In the image correcting apparatus set forth above, the main scanning direction distortion correcting means spreads the scanned image in the main scanning direction based on an spreading rate for each pixel detected with reference to an optical axis of the image reading means.

Consequently, the scanned image of the book document rising over the contact glass can be corrected without fail for the image distortion in the main scanning direction.

The image correcting apparatus set forth above further includes luminance correcting means for correcting the scanned image for a luminance.

Since the image is corrected for the luminance, the scanned image can be prevented from black stripes or ominous shadows.

The image correcting apparatus set forth above further includes a blur correcting means for correcting the scanned image for blurs.

Since the blur correcting means corrects the scanned image for blurred characters, the scanned image can be sharpened up.

The present invention also provides an image correcting apparatus for correcting a scanned image of a book document in contact with a contact glass of a scanner, read by image reading means. The image correcting apparatus includes binarizing means for binarizing the scanned image ready by the image reading means, character circumscribing rectangle extracting means for cropping characters from the binarized image processed by the binarizing means to extract rectangles which circumscribe the respective characters, character string extracting means for extracting a character string based on the character circumscribing rectangles extracted by the character circumscribing rectangle extracting means, rising amount estimating means for estimating a rising amount of the book document from the contact glass from the shape of the character string extracted by the character string extracting means, and image correcting means for correcting the scanned image or the binarized image based on the rising amount estimated by the rising amount estimating means.

For reading, for example, a book document, a scanned image is binarized to extract a character string, the three-dimensional shape of the book document (a rising amount of the book document from the contact glass) is estimated based on a change in the shape of the character string, and the scanned image is corrected for a distortion based on the rising amount of the book document from the contact glass. In this way, even a scanned image which does not contain all the page contour can be effectively corrected for a distortion with a small amount of calculations.

The image correcting apparatus set forth above further includes document discriminating means for counting the number of black pixels on the binarized image with respect to a sub-scanning direction in which the image reading means reads an image, creating a histogram with respect to a main scanning direction based on the count, and discriminating whether or not the scanned image represents a horizontally written document or a vertically written document based on a pattern presented by the histogram.

Since an image of horizontally written document results in a pattern of peaks and valleys repeated in the histogram, whereas such a pattern is not generated from an image of vertically written document, this pattern can be used to determine whether characters on a scanned image are written horizontally or vertically.

In the image correcting apparatus set forth above, the document discriminating means discriminates that the scanned image represents a horizontally written document when the histogram presents a pattern which is comprised of alternating areas with many black pixels and areas with few black pixels, and otherwise discriminates that the scanned image represents a vertically written document.

It is therefore possible to precisely discriminate whether the scanned image represents a horizontally written document or a vertically written document.

In the image correcting apparatus set forth above, responsive to the document discriminating means which discriminates that the scanned image represents a horizontally written document, the rising amount estimating means selects character strings having a predetermined percentage on the longest character string from the character strings extracted by the character string extracting means, selects a character string having the largest amount of curvature from the selected character strings as a reference character string, and estimates a rising amount based on the reference character string.

In the foregoing configuration, an optimal reference character string is selected to precisely estimate the rising amount of the book document from the contact glass.

In the image correcting apparatus set forth above, the rising amount estimating means measures the amount of curvature by the coordinates of the center of each of the character circumscribing rectangles included in the character string in the main scanning direction, and detects a larger amount of curvature as a larger difference exists between a maximum and a minimum of the coordinates of the center.

It is therefore possible to reasonably select the character string having the largest amount of curvature for the reference character string.

In the image correcting apparatus set forth above, responsive to the document discriminating means which discriminates that the scanned image represents a vertically written document, the rising amount estimating means selects character circumscribing rectangles at the heads of the respective character strings extracted by the character string extracting means, or selects character circumscribing rectangles at the tails of the respective character strings to create a reference character string, and estimates a rising amount based on the reference character string.

In the foregoing configuration, an optimal reference character string is selected to precisely estimate the rising amount of the book document from the contact glass based on the reference character string thus selected.

The image correcting apparatus set forth above further includes Hough transforming means for performing a Hough transform to the coordinates of the center of each character circumscribing rectangle included in the reference character string to estimate a straight section of the reference character string.

In the foregoing configuration, the straight section can be detected even from a mixture of a straight line and a curve.

The image correcting apparatus set forth above further includes shape approximating means for approximating the shape of the reference character string using a polynomial in accordance with a least square method.

In the foregoing configuration, the curvilinear section is extracted without fail.

In the image correcting apparatus set forth above, the rising amount estimating means measures the distance between an extension of the straight section of the reference character string extended to a curvilinear section and the curvilinear section, measures the distance between a focusing center line of the image reading means and the curvilinear section, and multiplies a value calculated by dividing the distance between the extension and the curvilinear section by the distance between the focusing center line and the curvilinear section by the distance from the center of a lens of the image reading means to the contact glass to derive a rising amount of the book document from the contact glass.

In the foregoing configuration, the rising amount estimating means measures the amount of distortion of the straight section to the inside to recover the three-dimensional shape.

In the image correcting apparatus set forth above, the rising amount estimating means estimates the rising amounts of the book document from the contact glass at a plurality of positions on the scanned image in the sub-scanning direction.

In the foregoing configuration, the rising amount is properly estimated.

In the image correcting apparatus set forth above, the rising amount estimating means estimates the rising amount independently for each of the left and right pages of the scanned document.

In the foregoing configuration, even if the book document rises over the contact glass by different amounts on the left and right sides of the binding margin, as can be seen when pages near the cover or back cover of a book document are open, the scanned image can be corrected more satisfactorily by independently estimating the different rising amounts.

The present invention further provides an image correcting apparatus for correcting a scanned image of a book document in contact with a contact glass of a scanner, read by image reading means. The image correcting apparatus includes binarizing means for binarizing the scanned image ready by the image reading means, rule extracting means for extracting rules from the binarized image processed by the binarizing means, rising amount estimating means for estimating a rising amount of the book document from the contact glass from the shape of the rules extracted by the rule extracting means, and image correcting means for correcting the scanned image or the binarized image based on the rising amount estimated by the rising amount estimating means.

For reading, for example, a book document, a scanned image is binarized to extract rules, the three-dimensional shape of the book document (a rising amount of the book document from the contact glass) is estimated based on a change in the shape of the rules, and the scanned image is corrected for a distortion based on the rising amount of the book document from the contact glass. In this way, even a scanned image which does not contain all the page contour can be effectively corrected for a distortion with a small amount of calculations.

In the image correcting apparatus set forth above, the rule extracting means counts the number of black pixels on the binarized image with respect to a sub-scanning direction in which the image reading means reads an image, creates a histogram with respect to a main scanning direction based on the count, and extracts the rules based on a pattern presented by the histogram.

In the foregoing configuration, rules drawn in the sub-scanning direction are extracted by the rule extracting means.

In the image correcting apparatus set forth above, the rule extracting means determines that a narrow high peak appearing on the histogram represents the rule.

With this determination, rules drawn in the sub-scanning direction are extracted without fail by the rule extracting means.

In the image correcting apparatus set forth above, the rising amount estimating means selects rules having a predetermined percentage on the longest rule from the rules extracted by the rule extracting means, selects a rule closest to the upper edge or lower edge of the scanned image as a reference rule, and estimates a rising amount based on the reference rule.

In the foregoing configuration, an optimal reference rule is selected to precisely estimate the rising amount of the book document from the contact glass.

The image correcting apparatus set forth above further includes Hough transforming means for performing a Hough transform to the coordinates of each of pixels included in the reference rule to estimate a straight section of the reference rule.

In the foregoing configuration, the straight section can be detected even from a mixture of a straight line and a curve.

The image correcting apparatus set forth above further includes shape approximating means for approximating the shape of the reference rule using a polynomial in accordance with a least square method.

In the foregoing configuration, the curvilinear section is extracted without fail.

In the image correcting apparatus set forth above, the rising amount estimating means measures the distance between an extension of the straight section of the reference rule extended to a curvilinear section and the curvilinear section, measures the distance between a focusing center line of the image reading means and the curvilinear section, and multiplies a value calculated by dividing the distance between the extension and the curvilinear section by the distance between the focusing center line and the curvilinear section by the distance from the center of a lens of the image reading means to the contact glass to derive a rising amount of the book document from the contact glass.

In the foregoing configuration, the rising amount estimating means measures the amount of distortion of the straight section to the inside to recover the three-dimensional shape.

In the image correcting apparatus set forth above, the rising amount estimating means estimates the rising amounts of the book document from the contact glass at a plurality of positions on the scanned image in the sub-scanning direction.

In the foregoing configuration, the rising amount is properly estimated.

In the image correcting apparatus set forth above, the rising amount estimating means estimates the rising amount independently for each of the left and right pages of the scanned document.

In the foregoing configuration, even if the book document rises over the contact glass by different amounts on the left and right sides of the binding margin, as can be seen when pages near the cover or back cover of a book document are open, the scanned image can be corrected more satisfactorily by independently estimating the different rising amounts.

According to another aspect, the present invention provides a program for causing a computer to correct a scanned image of a book document in contact with a contact glass of a scanner, read by image reading means. The program causes the computer to execute a divergent angle detecting function for detecting a divergent angle of the scanned image using a linear portion included in the scanned image of the book document, and a divergent distortion correcting function for correcting the scanned image for a divergent distortion based on the divergent distortion angle detected by the divergent distortion angle detecting function and subsequently correcting the scanned image for a shape distortion in a sub-scanning direction.

The divergent angle of the scanned image is detected using the linear portion included in the scanned image of the book document, and the scanned image is corrected for a divergent distortion based on the divergent distortion angle, and subsequently the scanned image is corrected for a shape distortion in the sub-scanning direction. In this way, the image quality can be prevented from degradation possibly caused by the three-dimensional distortion correction, if made to a scanned image distorted in a trapezoidal shapes.

In the program set forth above, the divergent angle detecting function executed by the computer includes a distortion region estimating function for detecting a straight section of the linear portion from each of a left and a right page of the scanned image, and detecting a boundary point between the straight section and a curvilinear section of the linear portion to estimate a distortion region, and a divergent distortion angle calculating function for calculating an angle formed by the straight section and the sub-scanning direction on each of the left and right pages of the scanned image.

The divergent distortion angles are calculated based on the angles formed by the straight sections of the linear portions on each of the left and right pages of the scanned image and the sub-scanning direction in which the book document is scanned. Since the divergent distortion angles are calculated only by detecting the straight sections of the linear portions, which are boundaries with the distortion region, the divergent distortion angles can be detected in a shorter time.

In the program set forth above, the divergent distortion correcting function executed by the computer includes a three-dimensional shape detecting function for detecting a three-dimensional shape of the book document, a main scanning direction distortion correcting function for spreading the scanned image in a main scanning direction based on the three-dimensional shape of the book document detected by the three-dimensional shape detecting function, an image rotating function for dividing the scanned image spread by the main scanning direction distortion correcting function into a left and a right page, and rotating the left and right pages respectively about predetermined positions by the divergent distortion angles detected by the divergent distortion angle detecting function, and a sub-scanning direction distortion correcting function for spreading the left and right pages in the sub-scanning direction based on the three-dimensional shape of the images rotated by the image rotating function.

In the foregoing configuration, the scanned image can be corrected without fail for the shape distortion in the sub-scanning direction after correcting the scanned image for the divergent distortion.

The present invention also provides a program for causing a computer to correct a scanned image of a book document in contact with a contact glass of a scanner, read by image reading means. The program causes the computer to execute a binarizing function for binarizing the scanned image ready by the image reading means, a character circumscribing rectangle extracting function for cropping characters from the binarized image processed by the binarizing function to extract rectangles which circumscribe the respective characters, a character string extracting function for extracting a character string based on the character circumscribing rectangles extracted by the character circumscribing rectangle extracting function, a rising amount estimating function for estimating a rising amount of the book document from the contact glass from the shape of the character string extracted by the character string extracting function, and an image correcting function for correcting the scanned image or the binarized image based on the rising amount estimated by the rising amount estimating function.

For reading, for example, a book document, a scanned image is binarized to extract character strings, the three-dimensional shape of the book document (a rising amount of the book document from the contact glass) is estimated based on a change in the shape of the character strings, and the scanned image is corrected for a distortion based on the rising amount of the book document from the contact glass. In this way, even a scanned image which does not contain all the page contour can be effectively corrected for a distortion with a small amount of calculations.

The program set forth above further causes the computer to execute a document discriminating function for counting the number of black pixels on the binarized image with respect to a sub-scanning direction in which the image reading means reads an image, creating a histogram with respect to a main scanning direction based on the count, and discriminating whether or not the scanned image represents a horizontally written document or a vertically written document based on a pattern presented by the histogram.

Since an image of horizontally written characters results in a pattern of peaks and valleys repeated in the histogram, whereas an image of vertically written characters is free from such a pattern, this pattern can be used to determine whether characters are horizontally or vertically written.

In the program set forth above, the computer executes the document discriminating function to discriminate that the scanned image represents a horizontally written document when the histogram presents a pattern which is comprised of alternating areas with many black pixels and areas with few black pixels, and otherwise discriminate that the scanned image represents a vertically written document.

It is therefore possible to precisely discriminate whether the scanned image represents horizontally written characters or a vertically written characters.

In the program set forth above, the computer executes the document discriminating function, responsive to the document discriminating function which discriminates that the scanned image represents a horizontally written document, to select character strings having a predetermined percentage on the longest character string from the character strings extracted by the character string extracting function, select a character string having the largest amount of curvature from the selected character strings as a reference character string, and estimate a rising amount based on the reference character string.

In the foregoing configuration, an optimal reference character string is selected to precisely estimate the rising amount of the book document from the contact glass.

In the program set forth above, the computer executes the rising amount estimating function to measure the amount of curvature by the coordinates of the center of each of the character circumscribing rectangles included in the character string in the main scanning direction, and detect a larger amount of curvature as a larger difference exists between a maximum and a minimum of the coordinates of the center.

It is therefore possible to reasonably select the character string having the largest amount of curvature for the reference character string.

In the program set forth above, the computer executes the rising amount estimating function, responsive to the document discriminating function which discriminates that the scanned image represents a vertically written document, to select character circumscribing rectangles at the heads of the respective character strings extracted by the character string extracting means, or select character circumscribing rectangles at the tails of the respective character strings to create a reference character string, and estimate a rising amount based on the reference character string.

In the foregoing configuration, an optimal reference character string is selected to precisely estimate the rising amount of the book document from the contact glass based on the reference character string thus selected.

The program set forth above further causes the computer to execute a Hough transforming function for performing a Hough transform to the coordinates of the center of each character circumscribing rectangle included in the reference character string to estimate a straight section of the reference character string.

In the foregoing configuration, the straight section can be detected even from a mixture of a straight line and a curve.

The program set forth above further causes the computer to execute a shape approximating function for approximating the shape of the reference character string using a polynomial in accordance with a least square method.

In the foregoing configuration, the curvilinear section is extracted without fail.

In the program set forth above, the computer executes the rising amount estimating function to measure the distance between an extension of the straight section of the reference character string extended to a curvilinear section and the curvilinear section, measure the distance between a focusing center line of the image reading means and the curvilinear section, and multiply a value calculated by dividing the distance between the extension and the curvilinear section by the distance between the focusing center line and the curvilinear section by the distance from the center of a lens of the image reading means to the contact glass to derive a rising amount of the book document from the contact glass.

In the foregoing configuration, the rising amount estimating means measures the amount of distortion of the straight section to the inside to recover the three-dimensional shape.

In the program set forth above, the computer executes the rising amount estimating function to estimate the rising amounts of the book document from the contact glass at a plurality of positions on the scanned image in the sub-scanning direction.

In the foregoing configuration, the rising amount is properly estimated.

In the program set forth above, the computer executes the rising amount estimating function to estimate the rising amount independently for each of the left and right pages of the scanned document.

In the foregoing configuration, even if the book document rises over the contact glass by different amounts on the left and right sides of the binding margin, as can be seen when pages near the cover or back cover of a book document are open, the scanned image can be corrected more satisfactorily by independently estimating the different rising amounts.

The present invention further provides a program for causing a computer to correct a scanned image of a book document in contact with a contact glass of a scanner, read by image reading means. The program causes the computer to execute a binarizing function for binarizing the scanned image ready by the image reading means, a rule extracting function for extracting rules from the binarized image processed by the binarizing function, a rising amount estimating function for estimating a rising amount of the book document from the contact glass from the shape of the rules extracted by the rule extracting function, and an image correcting function for correcting the scanned image or the binarized image based on the rising amount estimated by the rising amount estimating function.

For reading, for example, a book document, a scanned image is binarized to extract rules, the three-dimensional shape of the book document (a rising amount of the book document from the contact glass) is estimated based on a change in the shape of the rules, and the scanned image is corrected for a distortion based on the rising amount of the book document from the contact glass. In this way, even a scanned image which does not contain all the page contour can be effectively corrected for a distortion with a small amount of calculations.

In the program set forth above, the computer executes the rule extracting function to count the number of black pixels on the binarized image with respect to a sub-scanning direction in which the image reading means reads an image, create a histogram with respect to a main scanning direction based on the count, and extract the rules based on a pattern presented by the histogram.

In the foregoing configuration, rules drawn in the sub-scanning direction are extracted.

In the program set forth above, the computer executes the rule extracting function to determine that a narrow high peak appearing on the histogram represents the rule.

With this determination, rules drawn in the sub-scanning direction are extracted without fail.

In the program set forth above, the computer executes the rising amount estimating function to select rules having a predetermined percentage on the longest rule from the rules extracted by the rule extracting function, select a rule closest to the upper edge or lower edge of the scanned image as a reference rule, and estimate a rising amount based on the reference rule.

In the foregoing configuration, an optimal reference rule is selected to precisely estimate the rising amount of the book document from the contact glass.

The program set forth above further causes the computer to execute a Hough transforming function for performing a Hough transform to the coordinates of each of pixels included in the reference rule to estimate a straight section of the reference rule.

In the foregoing configuration, the straight section can be detected even from a mixture of a straight line and a curve.

The program set forth above further causes the computer to execute a shape approximating function for approximating the shape of the reference rule using a polynomial in accordance with a least square method.

In the foregoing configuration, the curvilinear section is extracted without fail.

In the program set forth above, the computer executes the rising amount estimating function to measure the distance between an extension of the straight section of the reference rule extended to a curvilinear section and the curvilinear section, measure the distance between a focusing center line of the image reading means and the curvilinear section, and multiply a value calculated by dividing the distance between the extension and the curvilinear section by the distance between the focusing center line and the curvilinear section by the distance from the center of a tens of the image reading means to the contact glass to derive a rising amount of the book document from the contact glass.

In the foregoing configuration, the rising amount estimating means measures the amount of distortion of the straight section to the inside to recover the three-dimensional shape.

In the program set forth above, the computer executes the rising amount estimating function to estimate the rising amounts of the book document from the contact glass at a plurality of positions on the scanned image in the sub-scanning direction.

In the foregoing configuration, the rising amount is properly estimated.

In the program set forth above, the computer executes the rising amount estimating function to estimate the rising amount independently for each of the left and right pages of the scanned document.

In the foregoing configuration, even if the book document rises over the contact glass by different amounts on the left and right sides of the binding margin, as can be seen when pages near the cover or back cover of a book document are open, the scanned image can be corrected more satisfactorily by independently estimating the different rising amounts.

According to a further aspect, the present invention provides a storage medium readable by a computer, which has stored thereon any of the programs set forth above.

The program stored on the storage medium can be installed into a computer to execute the same functions as described above.

According to a further aspect, the present invention provides an image correcting method for correcting a scanned image of a book document in contact with a contact glass of a scanner, read by image reading means. The image correcting method includes the steps of detecting a divergent angle of the scanned image using a linear portion included in the scanned image of the book document, and correcting the scanned image for a divergent distortion based on the divergent distortion angle detected by the divergent distortion angle detecting step and subsequently correcting the scanned image for a shape distortion in a sub-scanning direction.

The divergent angle of the scanned image is detected using the linear portion included in the scanned image of the book document, and the scanned image is corrected for a divergent distortion based on the divergent distortion angle, and subsequently the scanned image is corrected for a shape distortion in the sub-scanning direction. In this way, the image quality can be prevented from degradation possibly caused by the three-dimensional distortion correction, if made to a scanned image distorted in a trapezoidal shapes.

In the image correcting method set forth above, the divergent angle detecting step includes the steps of detecting a straight section of the linear portion from each of a left and a right page of the scanned image, and detecting a boundary point between the straight section and a curvilinear section of the linear portion to estimate a distortion region, and calculating an angle formed by the straight section and the sub-scanning direction on each of the left and right pages of the scanned image.

The divergent distortion angles are calculated based on the angles formed by the straight sections of the linear portions on each of the left and right pages of the scanned image and the sub-scanning direction in which the book document is scanned. Since the divergent distortion angles are calculated only by detecting the straight sections of the linear portions, which are boundaries with the distortion region, the divergent distortion angles can be detected in a shorter time.

In the image correcting method set forth above, the divergent distortion correcting step includes the steps of detecting a three-dimensional shape of the book document, spreading the scanned image in a main scanning direction based on the three-dimensional shape of the book document detected by the three-dimensional shape detecting step, dividing the scanned image spread by the main scanning direction distortion correcting step into a left and a right page, and rotating the left and right pages respectively about predetermined positions by the divergent distortion angles detected by the divergent distortion angle detecting step, and spreading the left and right pages in the sub-scanning direction based on the three-dimensional shape of the images rotated by the image rotating step.

In the foregoing configuration, the scanned image can be corrected without fail for the shape distortion in the sub-scanning direction after correcting the scanned image for the divergent distortion.

The present invention also provides an image correcting method for correcting a scanned image of a book document in contact with a contact glass of a scanner, read by image reading means. The image correcting method includes the steps of binarizing the scanned image ready by the image reading means, cropping characters from the binarized image processed by the binarizing step to extract rectangles which circumscribe the respective characters, extracting a character string based on the character circumscribing rectangles extracted by the character circumscribing rectangle extracting step, estimating a rising amount of the book document from the contact glass from the shape of the character string extracted by the character string extracting step, and correcting the scanned image or the binarized image based on the rising amount estimated by the rising amount estimating step.

For reading, for example, a book document, a scanned image is binarized to extract character strings, the three-dimensional shape of the book document (a rising amount of the book document from the contact glass) is estimated based on a change in the shape of the character strings, and the scanned image is corrected for a distortion based on the rising amount of the book document from the contact glass. In this way, even a scanned image which does not contain all the page contour can be effectively corrected for a distortion with a small amount of calculations.

The present invention further provides an image correcting method for correcting a scanned image of a book document in contact with a contact glass of a scanner, read by image reading means. The image correcting method includes the steps of binarizing the scanned image ready by the image reading means, extracting rules from the binarized image processed by the binarizing step, estimating a rising amount of the book document from the contact glass from the shape of the rules extracted by the rule extracting step, and correcting the scanned image or the binarized image based on the rising amount estimated by the rising amount estimating step.

For reading, for example, a book document, a scanned image is binarized to extract rules, the three-dimensional shape of the book document (a rising amount of the book document from the contact glass) is estimated based on a change in the shape of the rules, and the scanned image is corrected for a distortion based on the rising amount of the book document from the contact glass. In this way, even a scanned image which does not contain all the page contour can be effectively corrected for a distortion with a small amount of calculations.

According to a further aspect, the present invention provides an image reading apparatus which includes image reading means for reading a document image, and any of the image correcting apparatuses set forth above for correcting a scanned image read by the image reading means.

The image reading apparatus can provide similar advantages to the aforementioned image correcting apparatus.

According to a further aspect, the present invention provides an image forming apparatus which includes image reading means for reading a document image, any of the image correcting apparatuses set forth above for correcting a scanned image read by the image reading means, and an image printer for printing an image on a sheet based on image data output from the image distortion correcting apparatus.

The image forming apparatus can provide similar advantages to the aforementioned image correcting apparatus.

The above and the other objects, features and advantages of the present invention will become more apparent from the following detailed description of the preferred embodiment when read in conjunction with the accompanying drawings.

DETAILED DESCRIPTION OF THE PREFERRED EMBODIMENTS

A first embodiment of the present invention will be described with reference to FIGS. 1 through 26. An image correcting apparatus in the first embodiment is equipped in a digital copier which embodies an image forming apparatus, and an image reading apparatus is implemented by a scanner unit of the digital copier.

Figure 1:
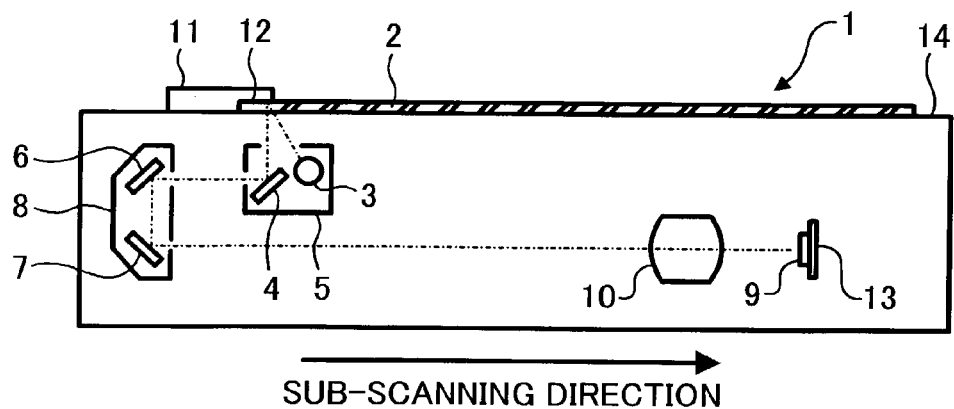
FIG. 1 is a vertical sectional view illustrating the configuration of a scanner unit in one embodiment of the present invention.

FIG. 1 is a vertical sectional view illustrating the configuration of the scanner unit 1. As illustrated in FIG. 1, the scanner unit 1 comprises a contact glass 2 for carrying a document thereon; a movable exposure unit 5 including an exposure lamp 3 for exposing a document and a first reflective mirror 4; a movable reflector unit 8 including a second reflective mirror 6 and a third reflective mirror 7; a CCD (Charge Coupled Device) 9 or an imager device for reading a document image; a lens unit 10 for focusing an image on the CCD 9; a document scale 11 for serving as a reference when a document is placed on the contact glass 2 and for preventing the contact glass 2 from shifting or coming off; a white reference plate 12 disposed blow the document scale 11 for shading correction; and a frame 14. The CCD 9 is formed on a sensor board 13.

Figure 3:
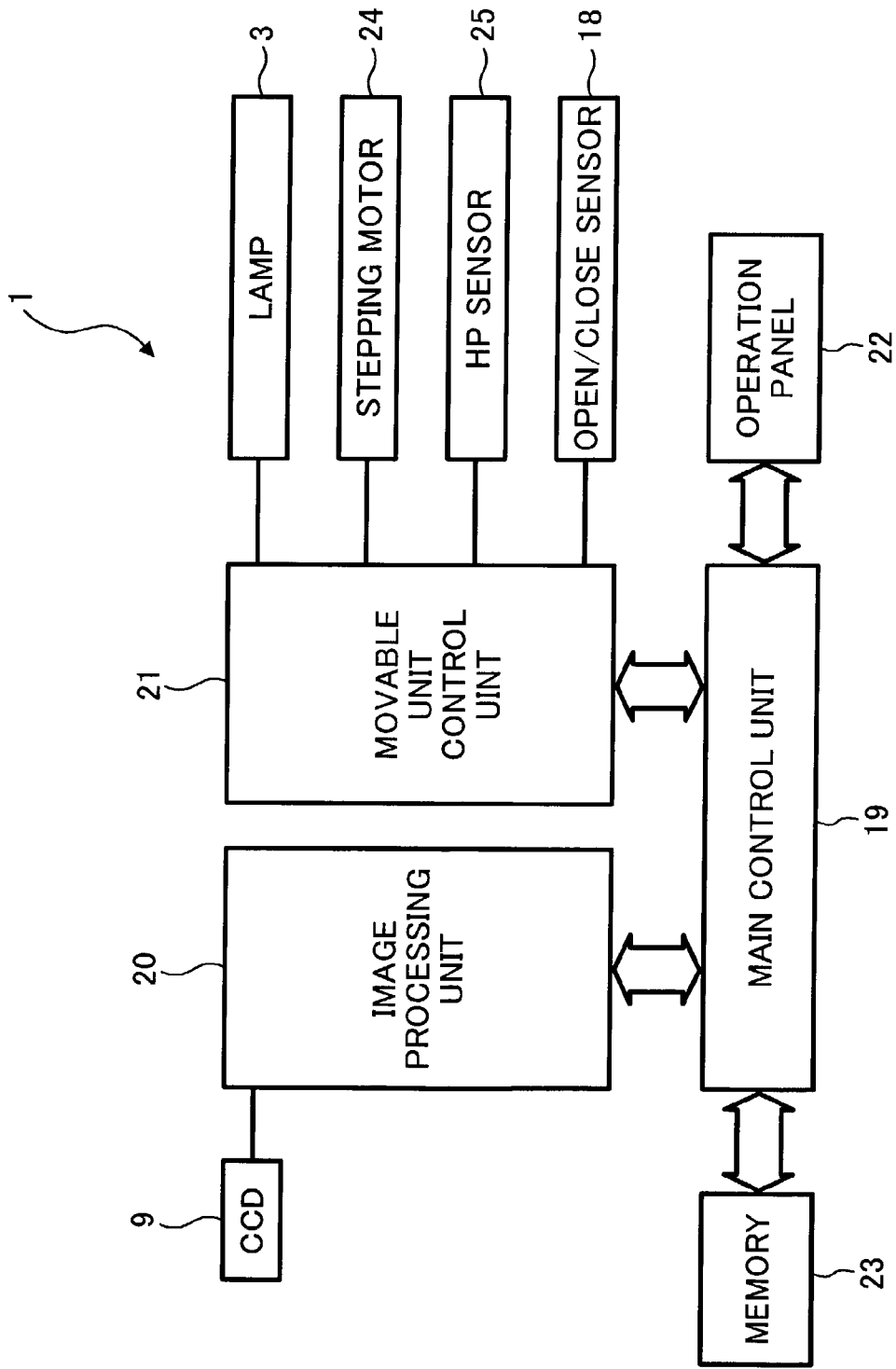
FIG. 3 is a block diagram illustrating electric connections in a scanner control system.

When a document is scanned, the movable exposure unit 5 and movable reflector unit 8 are moved in a sub-scanning direction by a stepping motor 24 (see FIG. 3). Specifically, the movable exposure unit 5 and movable reflector unit 8 run below the contact glass 2 to expose a document with the exposure lamp 3 for scanning, and reflected light from the document is reflected by the first reflective mirror 4, second reflective mirror 6 and third reflective mirror 7 and focused on the CCD 9 through the lens unit 10.

Figure 2:
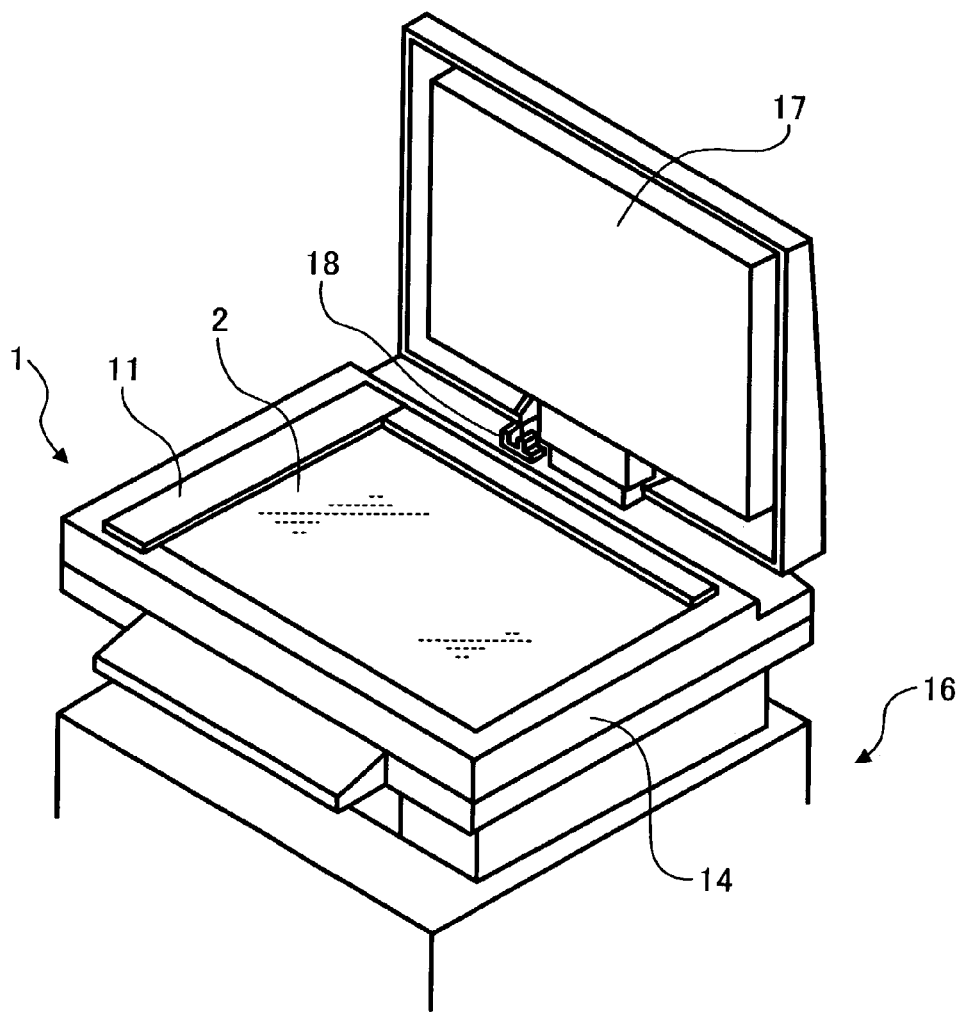
FIG. 2 is a perspective view illustrating a digital copier which is equipped with the scanner unit of FIG. 1 carried on the top.

The scanner unit 1 may be equipped in a digital copier 16 which comprises a printer unit (not shown) that embodies an image printing apparatus for forming an image on a sheet, for example, through the electrophotography in accordance with image data based on an image of a document read by the scanner unit 1. FIG. 2 is a perspective view illustrating the digital copier 16 which is equipped with the scanner unit 1 carried on the top. As illustrated in FIG. 2, the scanner unit 1 comprises a pivotable pressure plate 17 for opening and closing the contact glass 2; and an open/close sensor 18 for detecting that the pressure plate 17 is opened or closed. A variety of printing methods can be applied to a printer equipped in the digital copier 16, other than the electrophotographic method, such as an ink jet method, a sublimation thermal transfer method, a silver halide photographic method, a direct thermography method, a melt thermal transfer method and the like. Since their specific features are well known in the art, detailed description thereon is omitted.

FIG. 3 is a block diagram illustrating electric connections in a control system for the scanner unit 1. As illustrated in FIG. 3, the control system comprises a main control unit 19 for generally controlling the scanner unit 1; an image processing unit 20 for performing a variety of image processing on image data read by the CCD 9; a movable-unit control unit 21 for controlling the movable exposure unit 5 and movable reflector unit 8; an operation panel 22 for receiving a variety of operations to the digital copier 16 and for displaying a variety of messages; and a memory 23 for storing image data read by the CCD 9, predetermined data and the like. The components 20, 21, 22, 23 are connected to the main control unit 19. The operation panel 22 includes a copy start key for declaring a start of a copying operation, and the like. The movable-unit control unit 21 is connected to an exposure lamp 3; the stepping motor 24 for driving the movable exposure unit 5 and movable reflector unit 8; a scanner home position sensor (HP sensor) 25 for detecting whether or not the movable exposure unit 5 and movable reflector unit 8 remain at respective home positions; and the open/close sensor 18.

Figure 4:
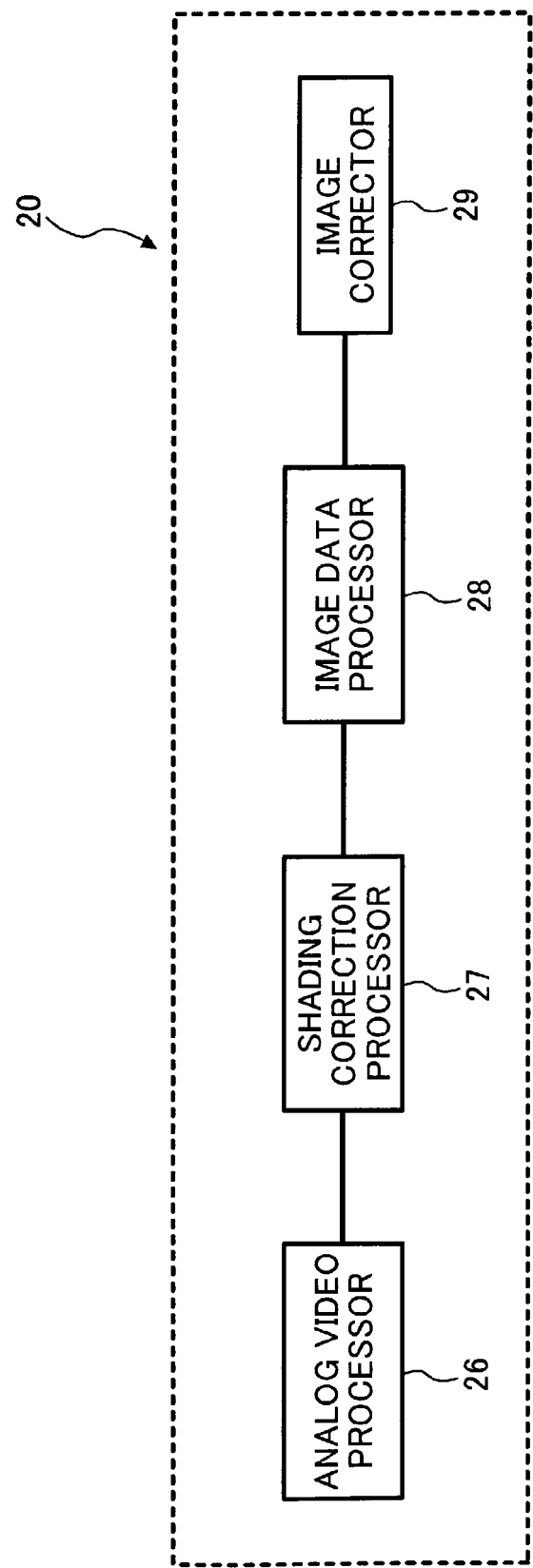
FIG. 4 is a block diagram illustrating the basic internal configuration of an image processing unit.

FIG. 4 is a block diagram illustrating the basic internal configuration of the image processing unit 20. As illustrated in FIG. 4, the image processing unit 20 comprises an analog video processor 26 for performing amplification, digital conversion and the like on an analog image signal read by the CCD 9 from a document; a shading correction processor 27 for performing a shading correction; an image data processor 28 for performing a variety of image data processing such as MTF correction, scaling, γ correction and the like on a digital image signal after the shading correction to generate a scanned image; and an image corrector 29 for implementing an image correcting function, which is a characteristic function of the first embodiment, on a scanned image. The digital image signal, after the foregoing image processing, is transmitted to the printer unit through the main control unit 19 and served for forming an image.

Figure 5:
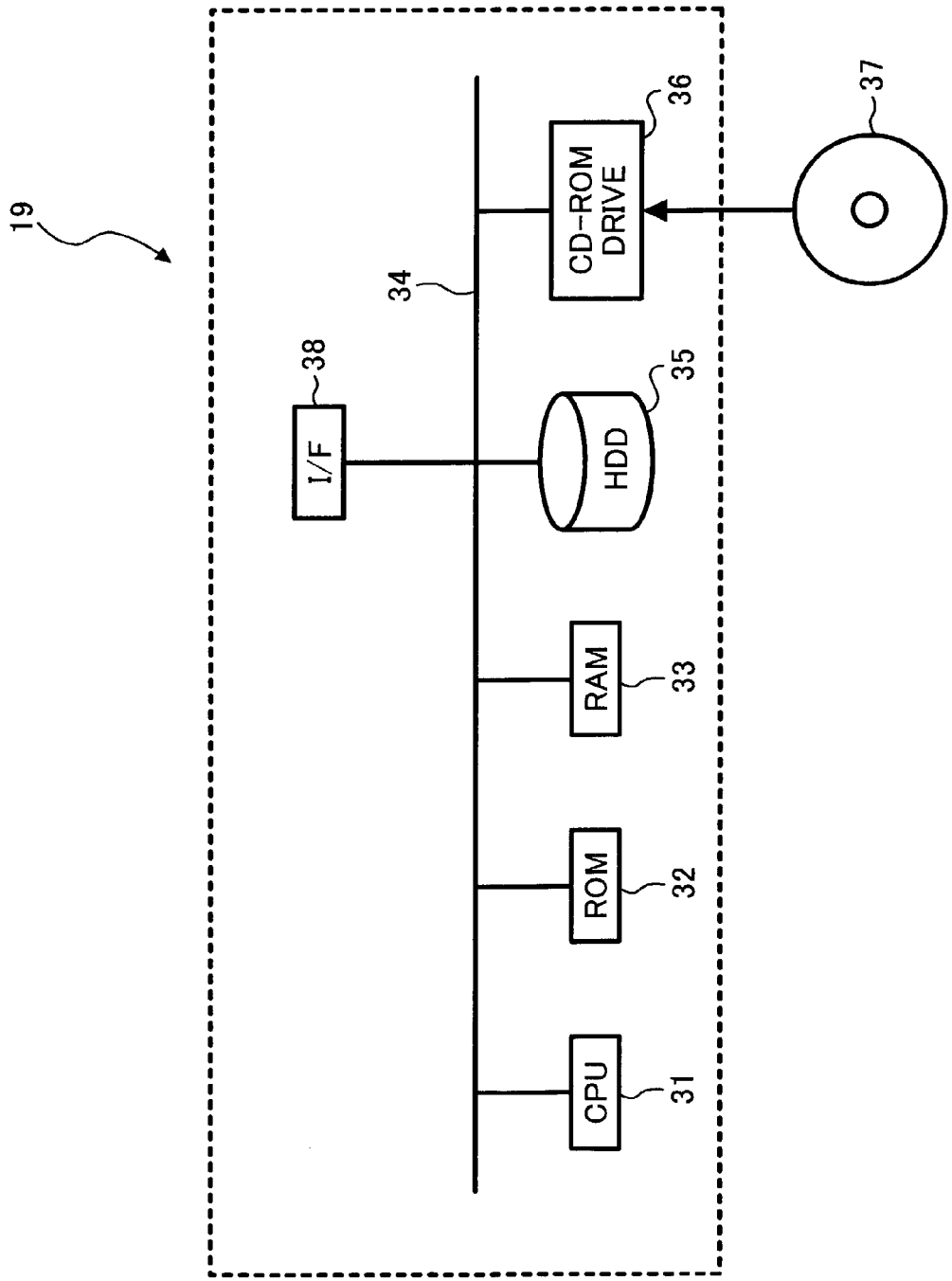
FIG. 5 is a block diagram illustrating electric connections in a main control unit.

As illustrated in FIG. 5, the main control unit 19 comprises a CPU (central Processing Unit) 31 for intensively controlling the respective components. The CPU 31 is connected through a bus 34 to a ROM (Read Only Memory) 32 which stores BIOS and the like, and a RAM (Random Access Memory) 33 which rewritably stores a variety of data and functions as a work area for the CPU 31. The bus 34 is further connected to a HDD (Hard Disk Drive) 35 which stores a control program; a CD-ROM drive 36 for reading a CD (Compact Disc) -ROM 37; and an interface (I/F) 38 for governing communications with the printer unit and the like.

The CD-ROM 37 shown in FIG. 5, which implements a storage medium of the present invention, stores a predetermined control program. The CPU 31 reads tie control program stored in the CD-ROM 37 through the CD-ROM drive 36 for installation into the HDD 35. In this way, the main control unit 19 can perform a variety of processing, as described later.

The storage medium is not limited to the CD-ROM 37 but may be any of media conforming to various standards, which include a variety of optical disks such as DVI), a variety of magneto-optical disks, a variety of magnetic disks such as a flexible disk, a semiconductor memory, and the like. Alternatively, a program may be downloaded from a network such as the Internet for installation into the HDD 35. In this event, a storage device which stores a program in a server on the transmission side falls under the storage medium of the present invention. The program may run on a predetermined OS (Operating System), in which case some of a variety of processing, later described, may be taken over by the OS or may be included in part of program files which comprise predetermined application software such as a word processing program, the OS, or the like.

Next, description will be made on a variety of processing performed by the CPU 31 of the main control unit 19 in accordance with the control program. Among the processing performed by the CPU 31, the following description will focus on a correction of a scanned image made by the image corrector 29 which is an image correcting apparatus that implements a function of correcting the scanned image, a characteristic function provided by the scanner unit 1 in the first embodiment.

Figure 6:
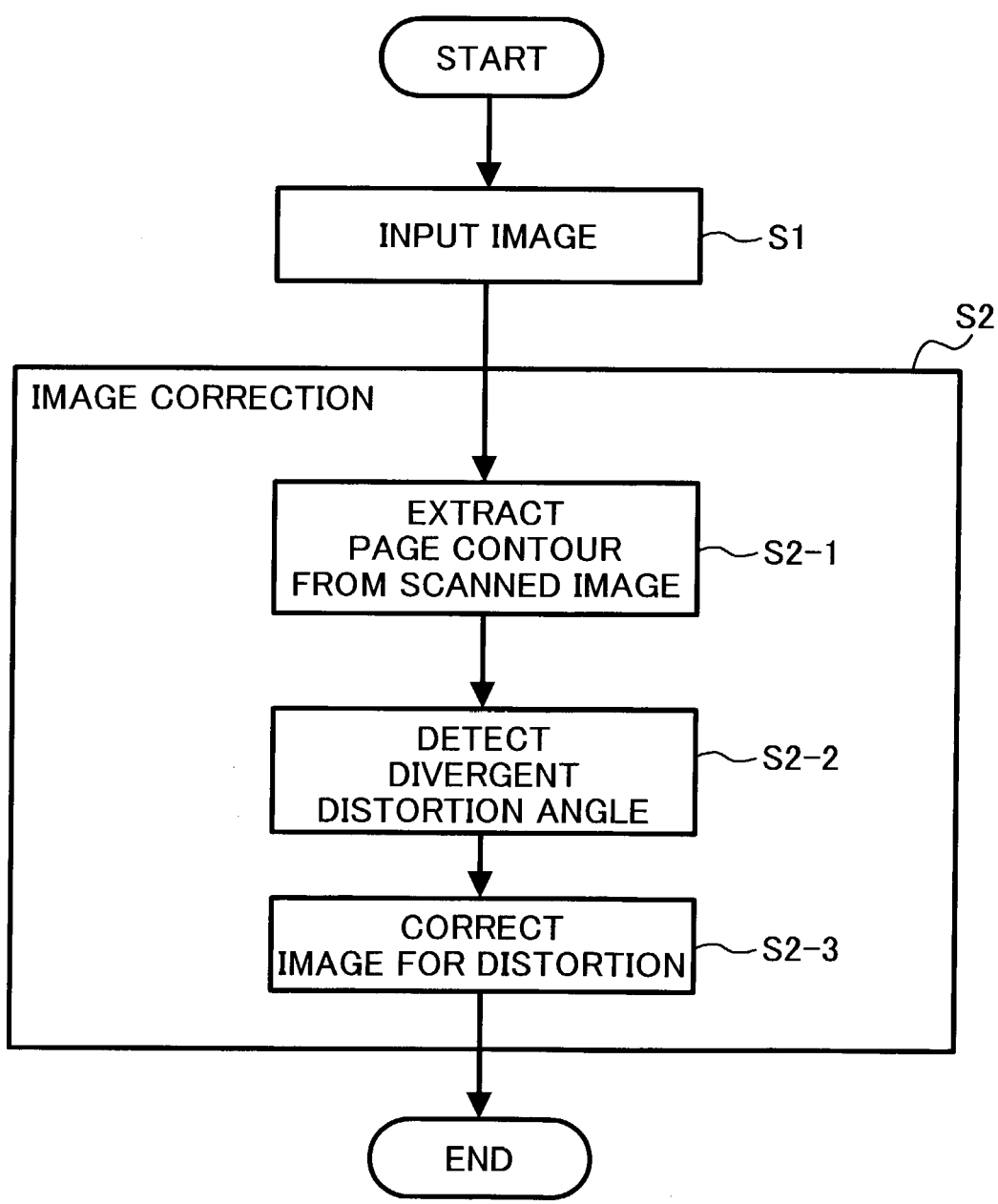
FIG. 6 is a flow chart generally illustrating a procedure for correcting a scanned image.
Figure 7:
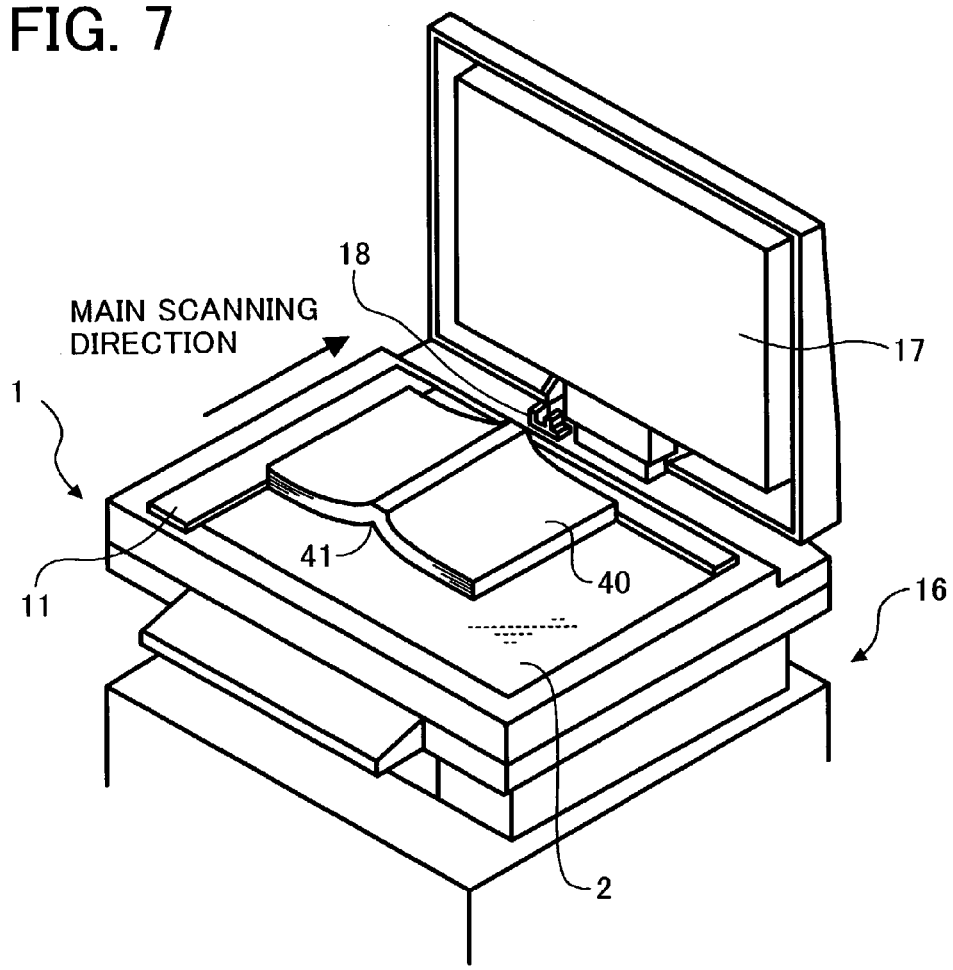
FIG. 7 is a perspective view illustrating a book document placed on a contact glass of the scanner unit.

FIG. 6 is a flow chart generally illustrating a procedure for correcting a scanned image. The following description is made on the assumption that a book document 40, facing downward, is carried on the contact glass 2 such that a binding margin 41 of the book document 40 is substantially in parallel with the main scanning direction of the scanner unit 1, as illustrated in FIG. 7.

Figure 8:
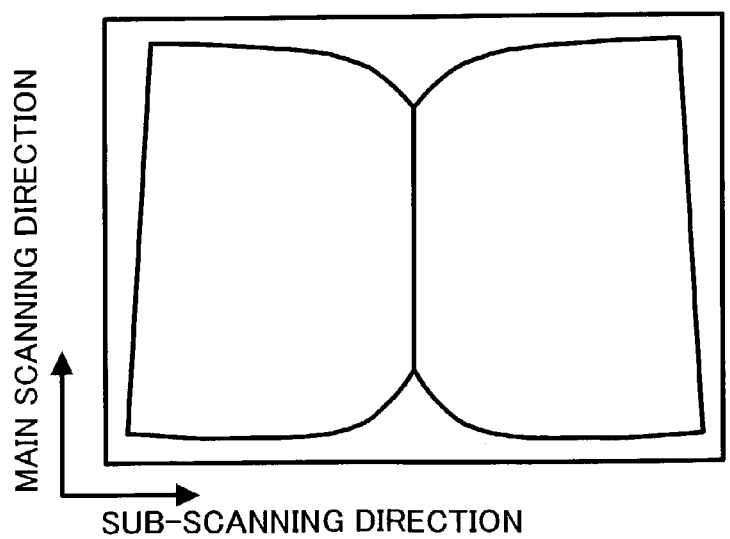
FIG. 8 is a top plan view illustrating an example of an input image.
Figure 9:
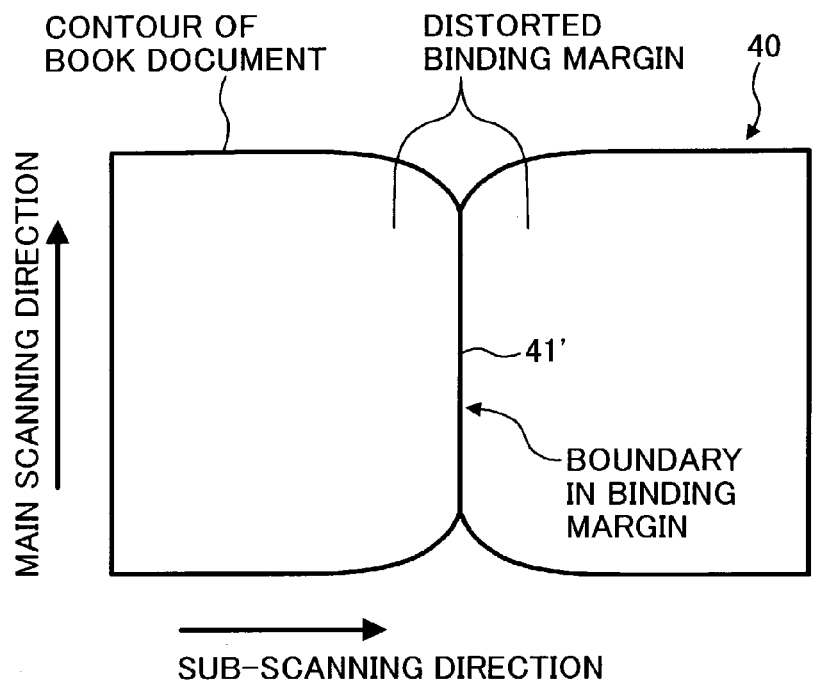
FIG. 9 is an explanatory diagram illustrating a distortion near a binding margin on a scanned image.

First, a scanned image of the book document 40 carried on the contact glass 2 is output from the image data processing unit 28 to the main control unit 19 (step S1). FIG. 8 illustrates an example of input image. As illustrated in FIG. 9, the scanned image of the book document 40, as input, is distorted near the binding margin 41.

Figure 10:
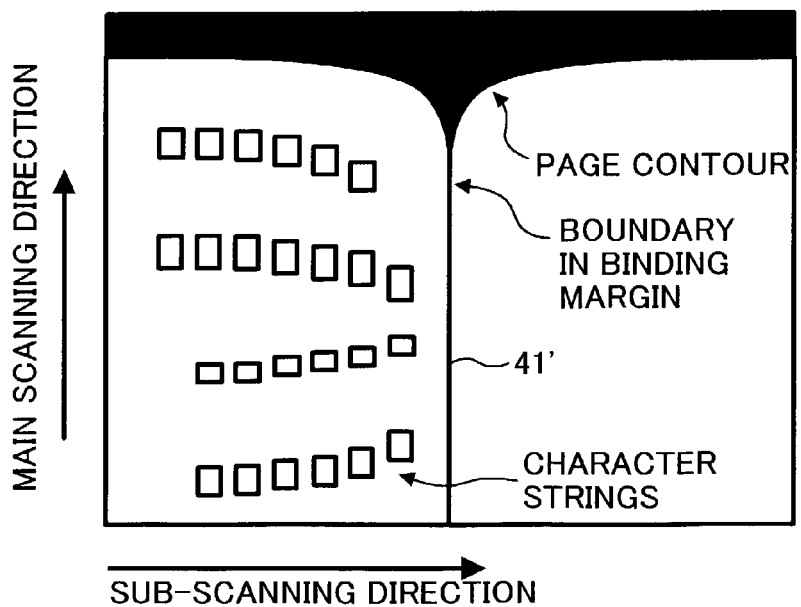
FIG. 10 is an explanatory diagram illustrating an example of scanned image which includes a page contour in an upper end region.
Figure 11:
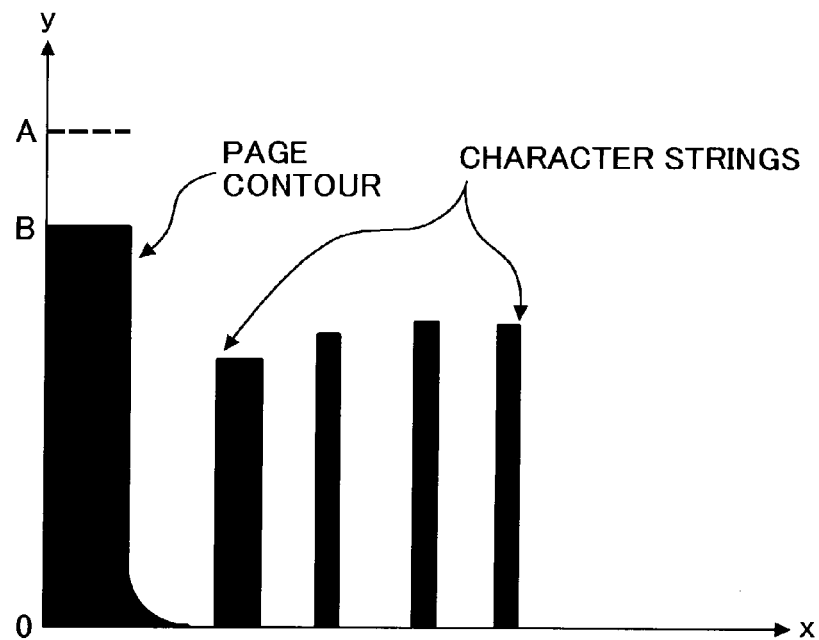
FIG. 11 is a histogram for black pixels on the left side of the boundary in the binding margin on the scanned image illustrated in FIG. 10.

Next, the flow proceeds to step S2 where the CPU 31 performs an image correction. In the image correction, the CPU 31 first extracts a page contour or a linear portion from the scanned image (step S2-1). FIG. 10 is an explanatory diagram illustrating an example of scanned image which includes a page contour in an upper end region, and FIG. 11 is a histogram for black pixels on the left side of the boundary of the binding margin on the scanned image illustrated in FIG. 10. In the histogram shown in FIG. 11, the x-axis represents the main scanning direction (vertical direction in FIG. 10) of the scanned image, and the upper edge of the scanned image is corresponded to the left end of the histogram. When a scanned image includes a page contour in a lower end region, the lower edge of the scanned image is corresponded to the right end of the histogram. Therefore, when the scanned image includes the page contour in the upper end region as illustrated in FIG. 10, a black zone appearing in an upper region of the scanned image results in a high vertical bar at the left end of the histogram shown in FIG. 11. In the first embodiment, this characteristic is utilized to determine whether or not the scanned image includes a page contour.

More specifically, as illustrated in FIG. 11, the ratio k of AO to BO is calculated by the equation shown below:

$$k = BO/AO$$

where AO is the distance from the scanned image 41' of the binding margin 41 to the left edge of the scanned image (left end of FIG. 10), and BO is the height of the vertical bar of the histogram. When the calculated ratio k is larger than a predefined threshold, it is determined that the scanned image includes a page contour.

When a scanned image includes page contours in upper and lower regions, high vertical bars appear on both left and right ends of the histogram, in which case like determination is made based on the high vertical bars at the left and right ends of the histogram whether or not the scanned image includes the page contours.

The determination as to whether the scanned image includes a page contour is made for each of left and right pages on either side of the binding margin on the scanned image.

Upon determining that the scanned image includes a page contour, the CPU 31 extracts the page contour together with information as to whether the page contour is positioned in the upper or lower region on each of the left and right pages for temporary storage in the RAM 33.

It should be understood that the method of extracting the page contour from the scanned image is not limited to the foregoing, but another method may be used instead, as described in Laid-open Japanese Patent Application No. 11-41455.

When it is previously known that a scanned image includes a page contour, the page contour may be extracted without the determination as to whether or not the scanned image includes the page contour.

Figure 12:
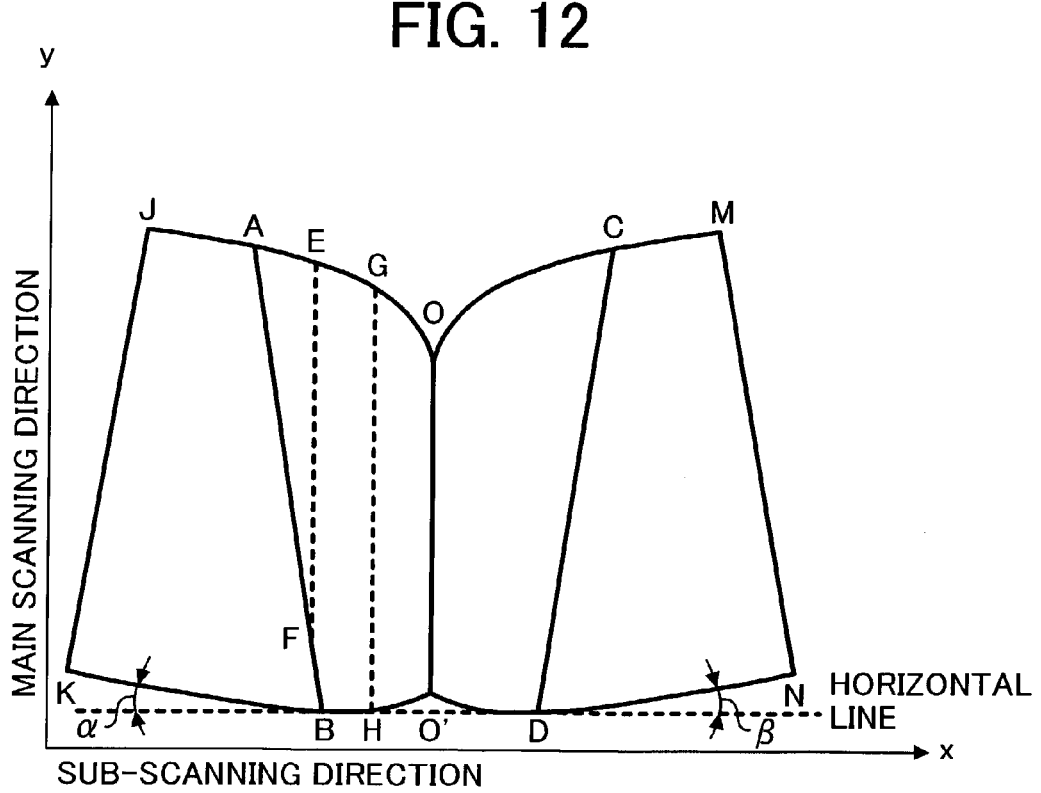
FIG. 12 is an explanatory diagram illustrating a technique for detecting the angle of a divergent distortion on the scanned image.

Upon extraction of the page contour from the scanned image, the flow proceeds to step S2-2, where the CPU 31 detects divergent distortion angles on the scanned image. More specifically, as shown in FIG. 12, the CPU 31 detects the divergent distortion angles α, β based on the page contour in the upper edge region of the scanned image. In FIG. 12, the scanned image has an image boundary as indicated by S.

Figure 13:
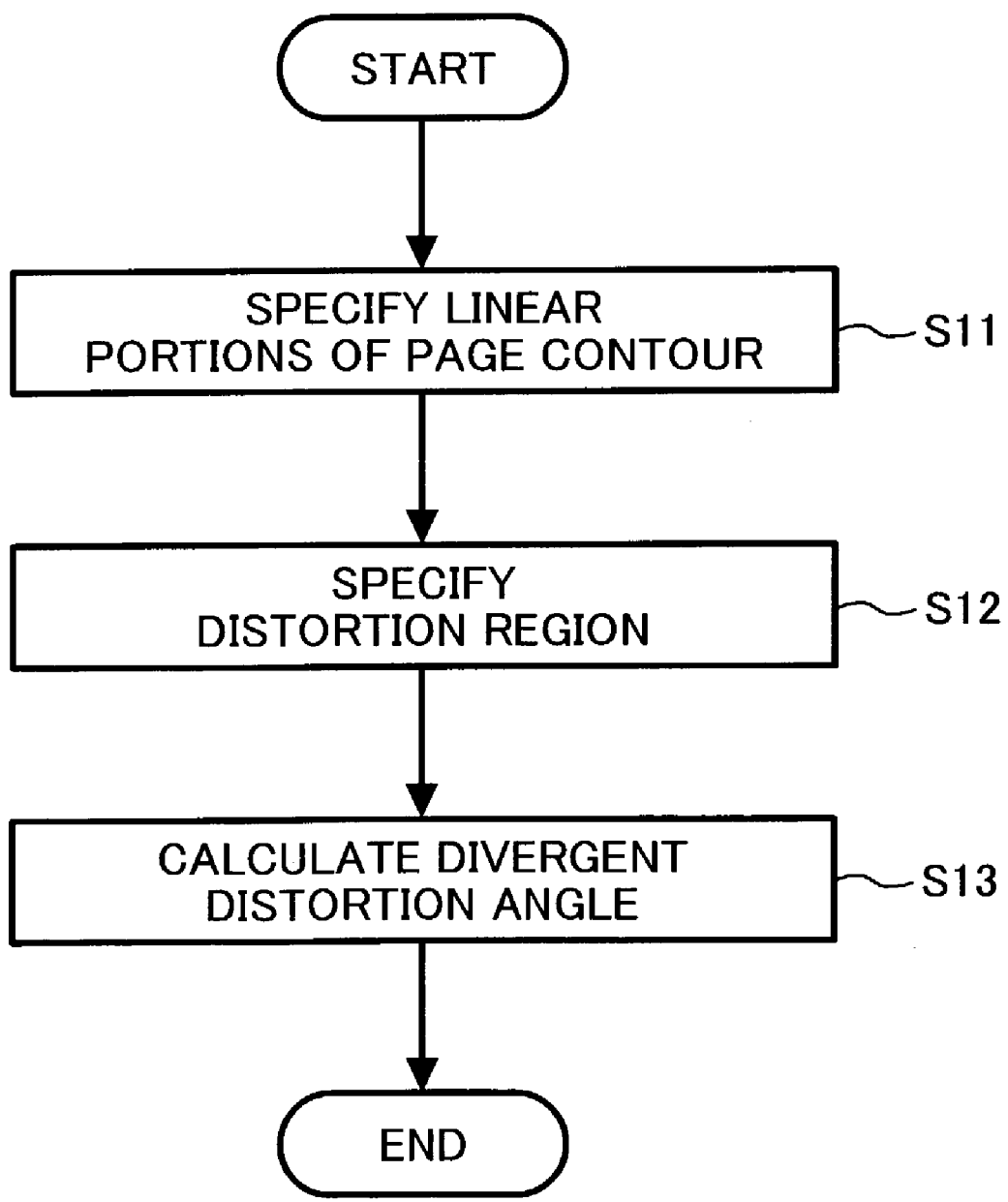
FIG. 13 is a flow chart illustrating a procedure for detecting the angles of a divergent distortion on a scanned image.

Now, a procedure for detecting the divergent distortion angles in the scanned image will be described with reference to FIG. 13. First, the CPU 31 estimates straight sections of the page contour extracted at step S2-1 (step S 11).

Next, the CPU 31 detects boundary points between the straight sections of the page contour estimated at step S11 and curvilinear sections of the page contour to estimate a distortion region on the scanned image (step S12). In FIG. 12, A, B, C, D designate the boundary points between the straight sections and the curvilinear sections of the page contour. The region surrounded by A, B, C, D defines the distortion region. For determining the boundary points between the straight sections and the curvilinear sections of the page contour, a variety of methods can be used. For example, an approach as described in Reference 2 can be used for the purpose. Generally, an approximate straight section is found based on the extracted page contour, and a point from which a curvilinear section separates from this straight section is determined as the boundary point between the straight section and the curvilinear section of the page contour.

At subsequent step S13, the CPU 31 calculates the angles (divergent distortion angles) α, β formed by the straight sections (line segments BK, DN in FIG. 12) of the page contour on the left and right pages of the scanned image and a horizontal line in the horizontal direction (sub-scanning direction) on the image. While a variety of methods are known for calculating the slope of a line segment, the divergent distortion angel α can be calculated, for example, from differences between the respective coordinate values at the points K and B in the main scanning direction and sub-scanning direction, and the divergent distortion angle β can be calculated from differences between the respective coordinate values at the points N and D in the main scanning direction and sub-scanning direction.

Figure 14:
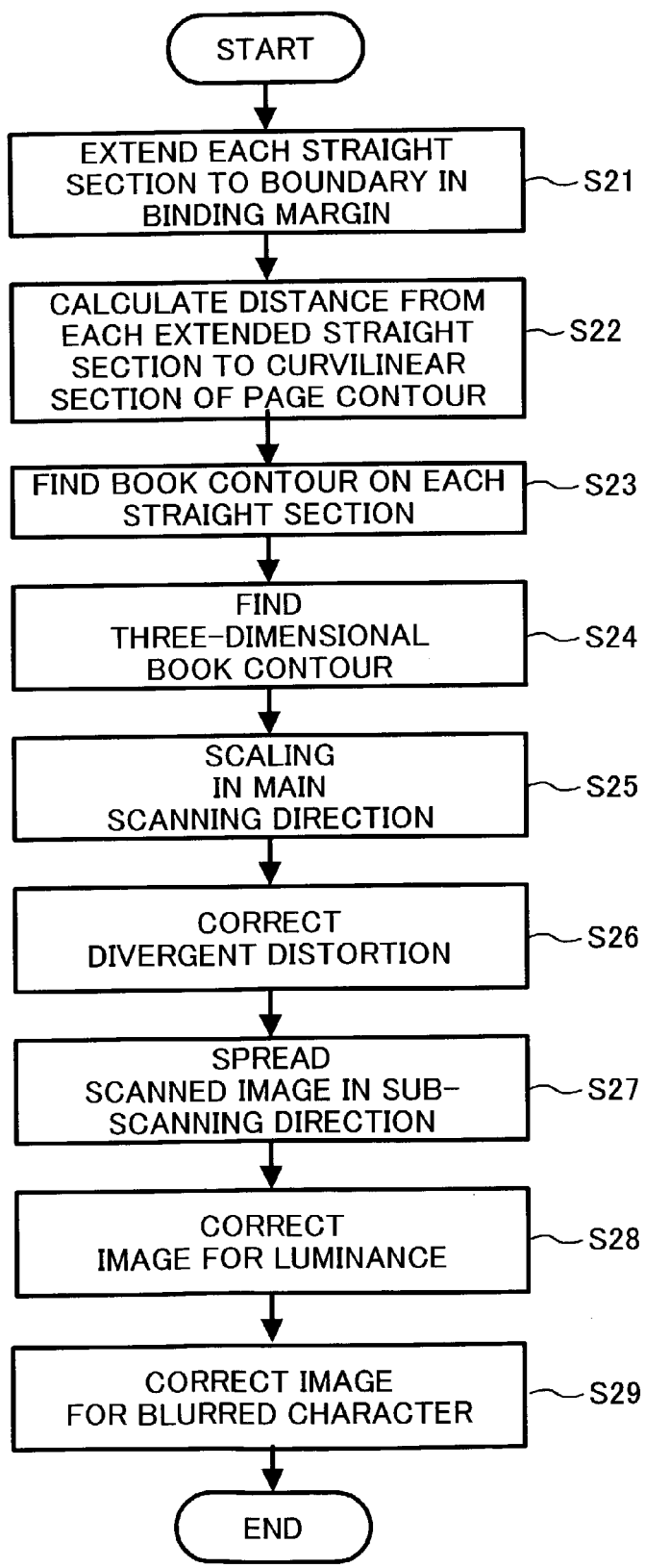
FIG. 14 is a flow chart illustrating a procedure for correcting the scanned image for the distortion.
Figure 15:
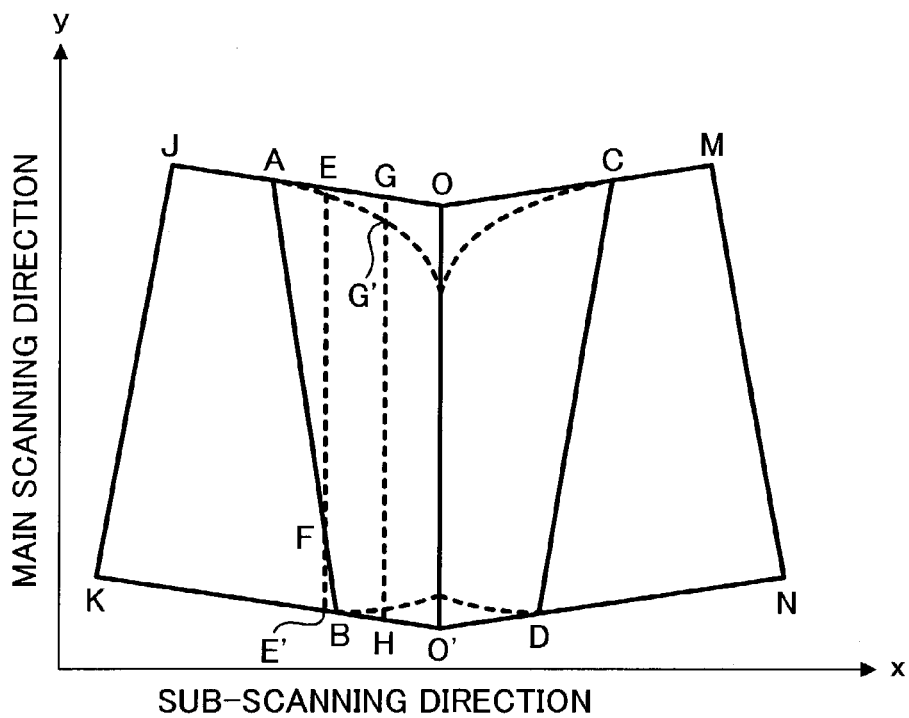
FIG. 15 is an explanatory diagram illustrating how straight sections in a page contour of left and right pages on the scanned image are extended to the boundary of the binding margin.

Upon completion of the detection of the divergent distortion angles on the scanned image at step S2-2, the flow proceeds to step S2-3, where the CPU 31 corrects the scanned image for a distortion. FIG. 14 illustrates a procedure for correcting the scanned image for a distortion. As illustrated in FIG. 14, the CPU 31 first extends the straight section of the page contour on each of the left and right pages of the scanned image (line segments BK, DN, AJ, CM in FIG. 12) to the boundary in the binding margin (a line segment indicated by O-O' in FIG. 12) (step S21). FIG. 15 shows how the straight sections (line segments BK, DN, AJ, CM) of the page contour on the left and right pages of the scanned image are spread to the boundary in the binding margin.

Next, the CPU 31 finds the distance from a predetermined position on each of the extended straight sections (line segments KO', O'N, JO, OM) to the associated curvilinear section of the page contour on the scanned image, in parallel with the boundary in the binding margin (step S22). For example, as illustrated in FIG. 15, the CPU 31 finds a line segment GH parallel with the boundary in the binding margin from a predetermined position G on the line segment JO, and then calculates the distance GG' from the line segment GH to the curvilinear section of the page contour.

Figure 16:
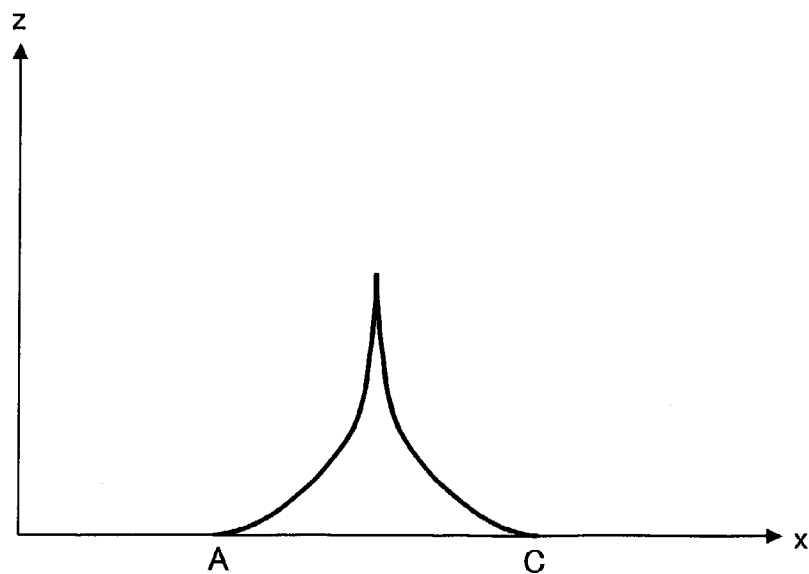
FIG. 16 is an explanatory diagram illustrating the shape of the book document on line segments JO, OM.
Figure 17:
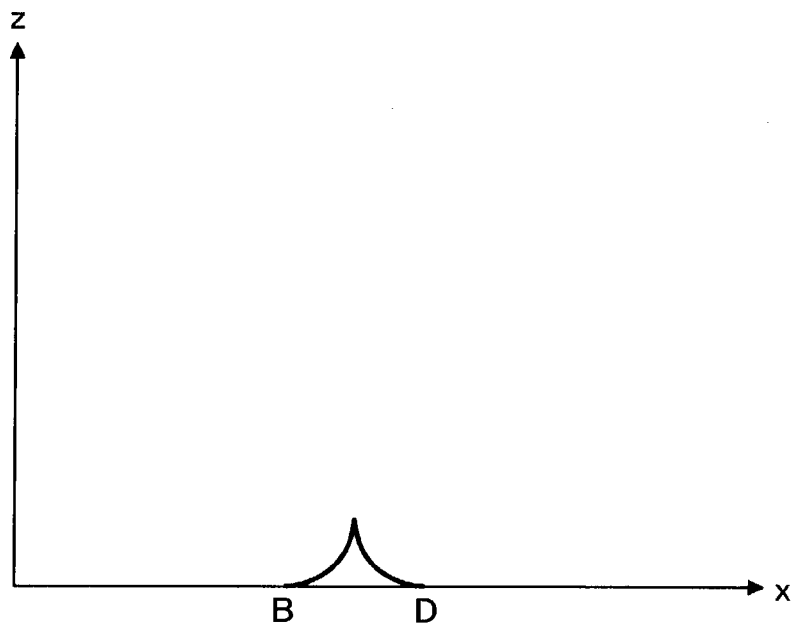
FIG. 17 is an explanatory diagram illustrating the shape of the book document on line segments KO', O'N.

Subsequently, the flow proceeds to step S23, where the CPU 31 finds a book contour in the z-direction on each straight section (in a direction perpendicular to the drawing sheet in FIG. 15) based on the distances from the predetermined positions on the respective straight sections (line segments KO', O'N, JO, OM) to the associated curvilinear sections of the page contours. The book contour can be found by the method described in Reference 2. Since this method is known, description thereon is omitted. FIG. 16 illustrates a book contour viewed on the line segments JO, OM, and FIG. 17 illustrates a book contour viewed on the line segments KO', O'N.

Next, the CPU 31 finds a three-dimensional book contour within a distortion region on the line segments AO, OC, BO', O'D (step S24).

Line segments AB, CB are boundaries between a portion of the book document which rises above the contact glass and a portion of the book document which is in contact with the contact glass 2. The line segments AB, CD are level with the contact glass 2. By detecting the book contours on the line segments AO, OC, BO', O'D and the book contour on the line segments AB, CD, a three-dimensional book contour can be found within the distortion region defined by the line segments AO, OC, BO', O'D, using these contour data.

Figure 18:
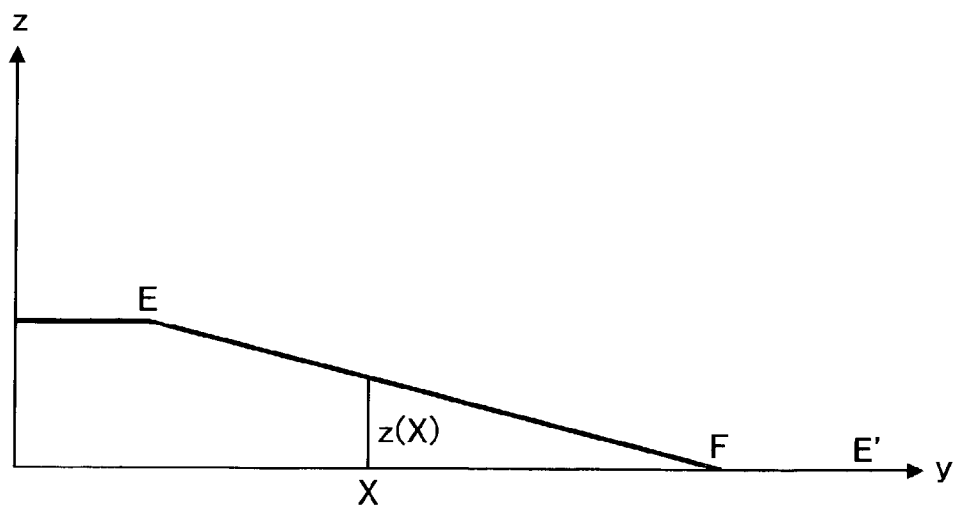
FIG. 18 is an explanatory diagram illustrating the shape in cross section along a line segment EE' parallel with the boundary of the binding margin.

Now, detailed description will be made on a method of finding the three-dimensional book contour within the distortion region defined by the line segments AO, OC, BO', O'D at step S24. FIG. 18 illustrates the shape in cross section taken along a line segment EE' parallel with the binding margin boundary (line segment indicated by O-O'), where the intersection of the line segment EE' with the line segment AB is designated by F (see FIG. 15). As mentioned above, since the heights at points E, F are known on the three dimensional contour, the height at any point between the points E, F can be found by linear interpolation of the coordinate values at the points E, F. Specifically, the height z(X) at a point X between the points E, F can be calculated by the following equation (1):

$$z(X) = \frac{z(E)}{y(E) - y(F)}(y(X) - y(E)) + z(E) \tag{1}$$

Figure 19:
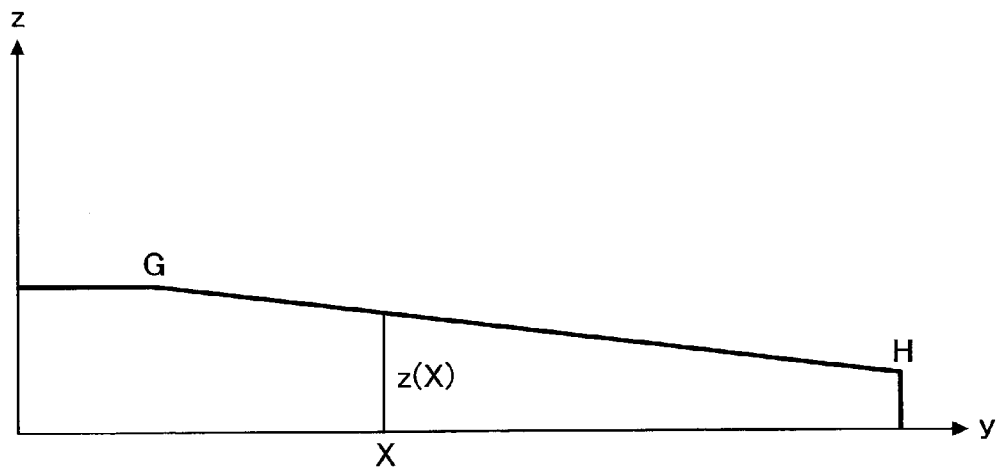
FIG. 19 is an explanatory diagram illustrating the shape in cross section taken along a line segment GH parallel with the boundary of the binding margin.

Similarly, FIG. 19 illustrates the shape in cross section taken along a line segment GH parallel with the binding margin boundary (line segment indicated by O-O'), where the intersection of the line segment GH with the line segment KO' is designated by H (see FIG. 15). As mentioned above, since the heights at points G, H are known, the height at any point between the points G, H can be found by linear interpolation of the heights at the points G, H. Specifically, the height z(X) at a point X between the points G, H can be calculated by the following equation (2):

$$z(X) = \frac{z(G) - z(H)}{y(G) - y(H)}(y(X) - y(G)) + z(G) \tag{2}$$

In the foregoing manner, the three-dimensional contour of the book document within the distortion region defined by the line segments AO, OC, BO', O'D can be found by calculating one by one the heights at points on lines parallel with the boundary in the binding margin.

Figure 20:
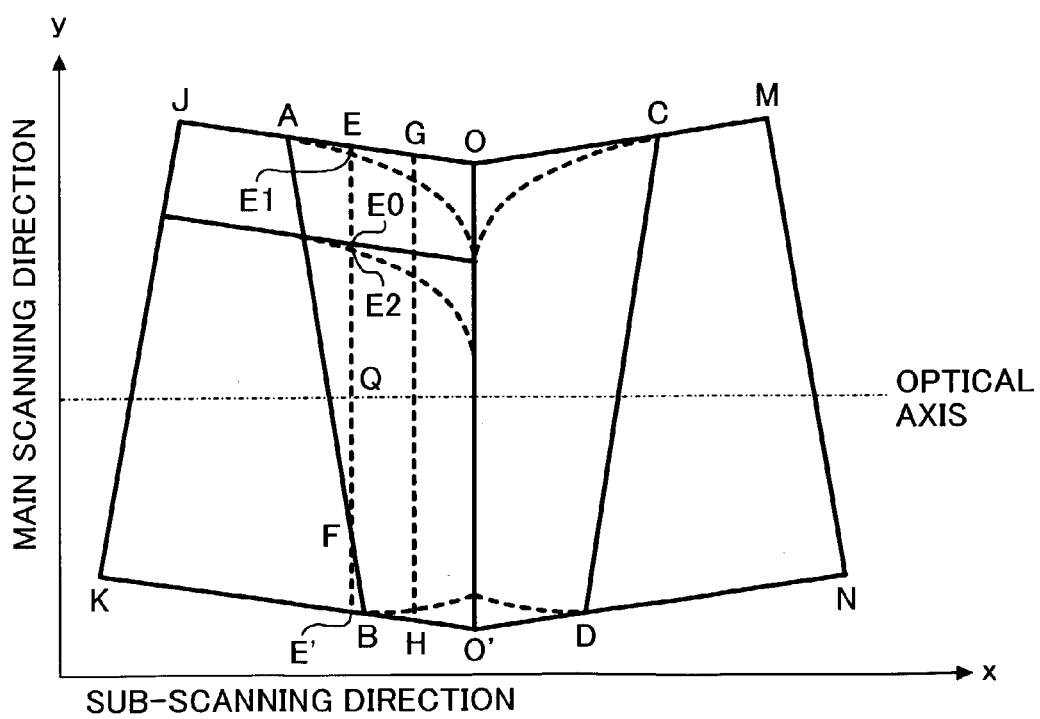
FIG. 20 is an explanatory diagram showing a technique for varying a scaling factor in a main scanning direction.

Next, the flow proceeds to step S25, where the CPU 31 scales the scanned image in the main scanning direction. As illustrated in FIG. 20, the scaling in the main scanning direction is performed such that the image is in alignment with each straight section of the page contour (line segments KO', O'N, JO, OM) with reference to the optical axis.

Figure 21:
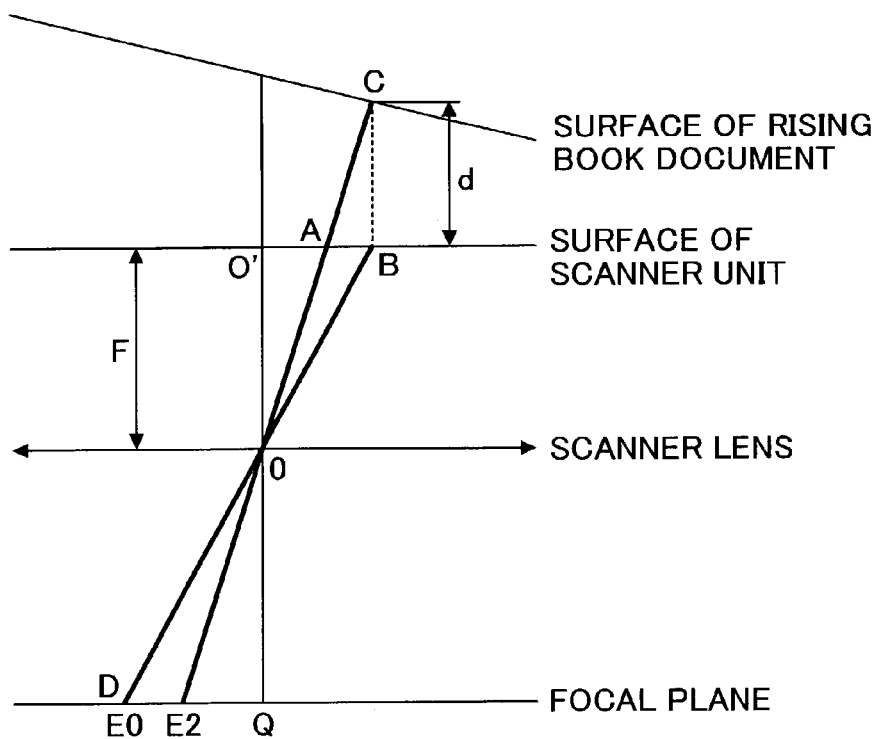
FIG. 21 is an explanatory diagram showing how a scanner lens focuses a scanned image.

The scaling in the main scanning direction will be described below in more specific manner. FIG. 21 shows how the scanner lens focuses a scanned image, wherein the optical axis of the lens is designated by OO', and the center of the lens by 0. The distance F from the center 0 of the lens to the surface of the scanner unit (contact glass 2) is referred to as a focal distance of the scanner unit. A point B on the surface of the scanner unit is focused at D on the focal plane. A point C on the rising book (book document 40) is focused at E2 on the focal plane. The distances from the respective points to the center 0 of the focal plane are designated by E0, E2, respectively (While the center 0 is moved as the movable exposure unit 5 and movable reflector unit 8 are moved in the sub-scanning direction, the trace is referred to as a focusing center line). The following equations (3), (4) are derived from the similarity principles of triangles. The focal distance F of the lens is a known amount determined by the scanner unit 1, and represented by a set value of the scanner unit 1 or a calibration value of the lens.

$$d/F = AB/AO' \tag{3}$$

$$AB/AO' = (E0 - E2)/E2 \tag{4}$$

where d represents the level of the book document 40 rising from the surface of the scanner unit (contact glass 2) at a point on the three-dimensional book contour within the distortion region found at step S24.

Then, a scaling factor m can be calculated from the following equation (5) through the equations (3), (4):

$$m = E0/E2 = (d/F) + 1 \tag{5}$$

Specifically, the position of E2 is calculated by the following equation (6) based on the scaling factor m at each pixel position E0 within the distortion region defined by the line segments AO, OC, BO', O'D:

$$E2 = E0/m = E0/((d/F)+1) \qquad (6)$$

Then, the pixel value at E2 is substituted into E0 to spread the image in the main scanning direction. In this event, since the position of E2 can be fractional, linear interpolation is also performed for pixels.

Upon completion of the scaling in the main scanning direction, the flow proceeds to step S26, where the CPU 31 corrects the scanned image for the divergent distortion based on the divergent distortion angles α, β calculated at step S13. Generally, the correction for the divergent distortion involves dividing the scanned image into the left and right pages along the boundary in the binding margin (line segment indicated by O-O' in FIG. 20), and rotating the left and right pages by the divergent distortion angles α, β, respectively, about a predetermined position (for example, the lower end O' of the boundary in the binding margin on the scanned image). The correction for the divergent distortion also includes dividing the three-dimensional book contour within the distortion region defined by the line segments AO, OC, BO', O'D found at step S24 along the boundary in the binding margin (line segment indicated by O-O' in FIG. 20) and rotating the divided contours by the divergent distortion angles α, β, respectively.

It should be noted that in the correction for the divergent distortion, simple rotations of the left and right pages on the scanned image may result in fractional coordinates of pixels on the corrected image, possibly degrading the image quality of the image corrected for the divergent distortion. To solve this problem, linear interpolation is performed for pixels in the first embodiment.

Figure 22:
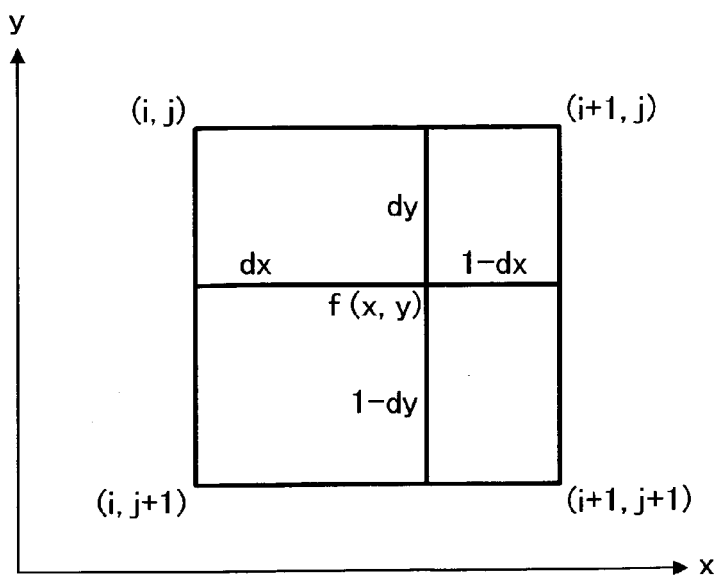
FIG. 22 is an explanatory diagram showing how a pixel value is found by linear interpolation.

FIG. 22 is an explanatory diagram showing how a pixel value is calculated through the linear interpolation. A pixel value f(x,y) at coordinates (x, y) shown in FIG. 22 is calculated by linearly interpolating pixel values f(i,j), f(i+1,j), f(i, j+1), f(i+1, j+1) of surrounding blocks [i,j], [i+1,j], [i,j+1], [i+1,j+1] after they are smoothed. More specifically, the pixel value f(x,y) at the coordinates (x,y), after the linear interpolation, is calculated by:

$$f(x, y) = [f(i, j)*(1-dx) + f(i+1, j)*dx]*(1-dy) + \qquad (7)$$
$$[f(i, j+1)*(1-dx) + f(i+1, j+1)*dx]*dy$$

Figure 23:
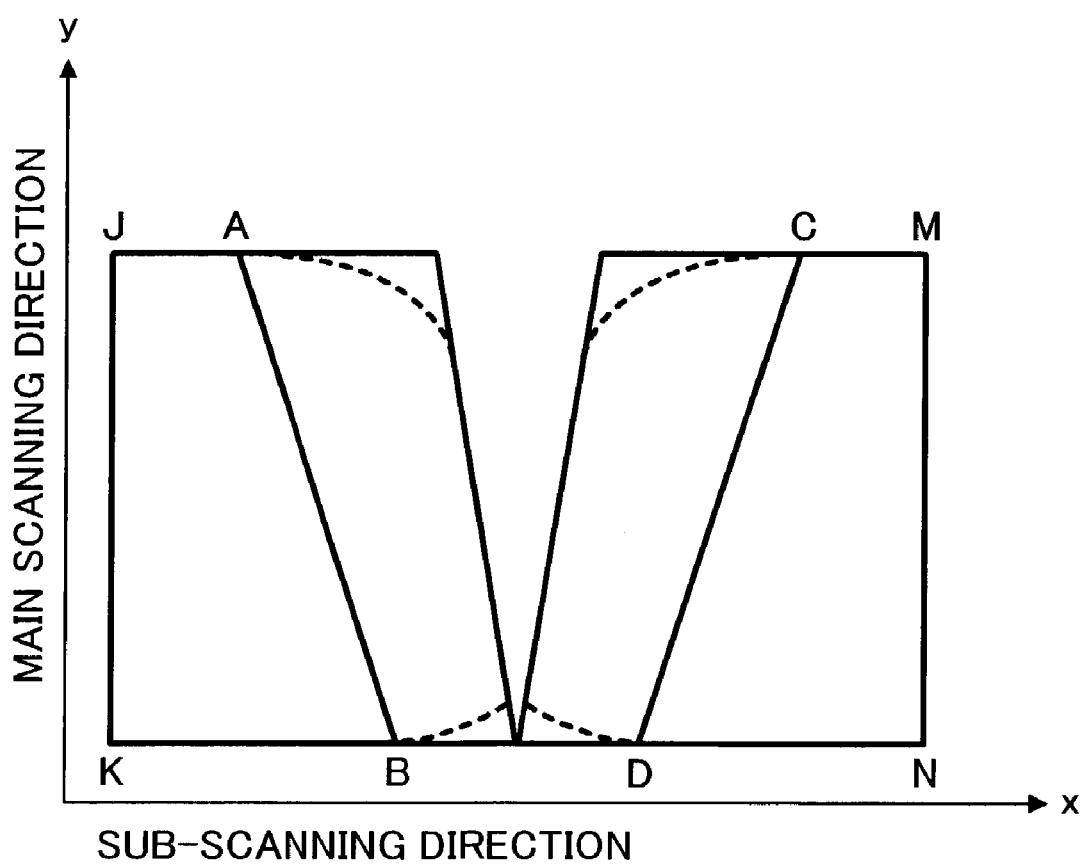
FIG. 23 is an explanatory diagram illustrating the scanned image after the left and right pages in the image of FIG. 20 have been corrected for the divergent distortion.

The correction of the scanned image for divergent distortion based on the divergent distortion angles α, β calculated at step S13 is concluded with the foregoing calculation. FIG. 23 illustrates the scanned image after the left and right pages of the image in FIG. 20 has been corrected for the divergent distortion.

Upon completion of the correction of the scanned image for the divergent distortion, the flow proceeds to step S27, where the scanned image is spread in the sub-scanning direction.

Figure 24A:
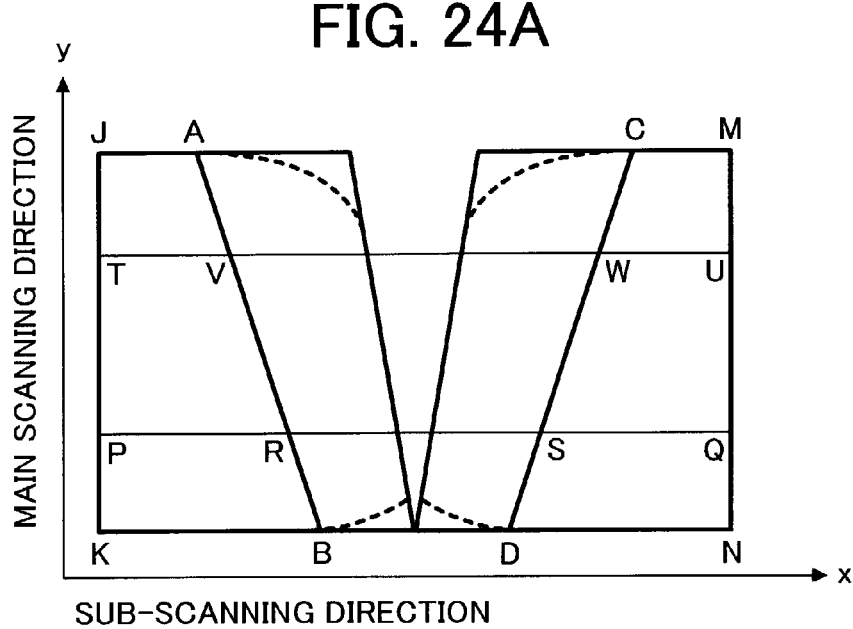
FIG. 24 is an explanatory diagram showing a technique for spreading a scanned image in a sub-scanning direction.
Figure 24B:
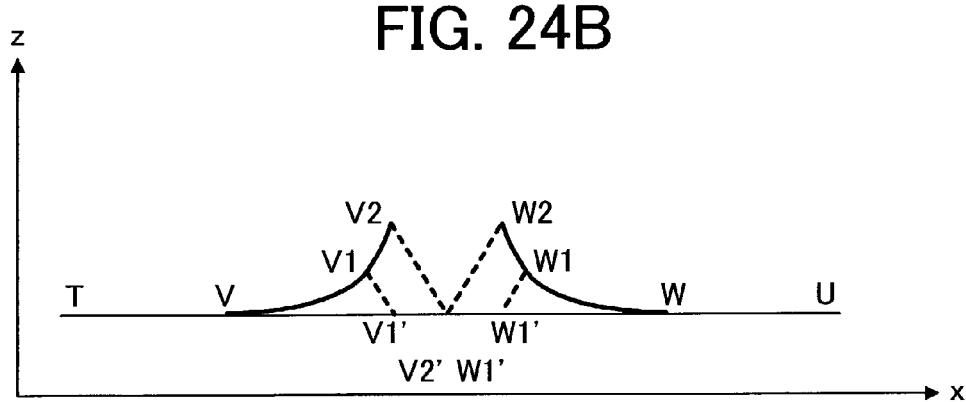
Figure 24C:
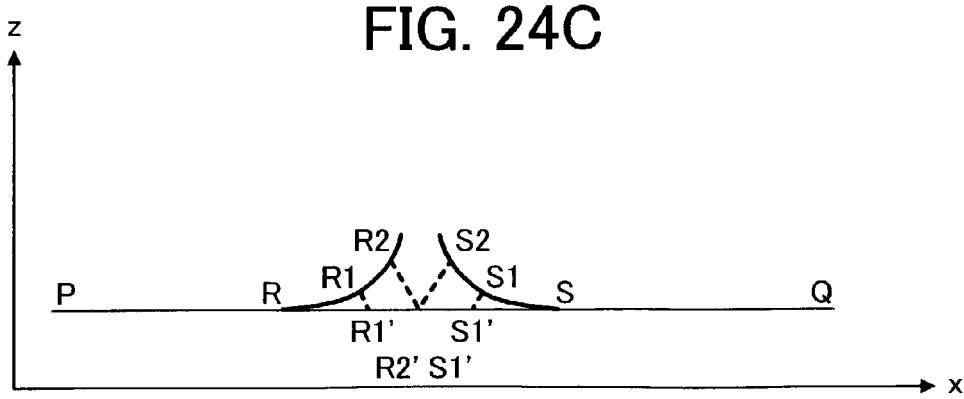

The spreading of the scanned image in the sub-scanning direction will be described below in specific manner. Each of the rotated images is spread line by line in the sub-scanning direction. For this purpose, a variety of methods can be used, for example, a method of recovering in the sub-scanning direction as described in Reference 2. FIG. 24A illustrates a scanned image of a book document, and FIG. 24B shows how a cross-section TU in FIG. 24A is spread. As illustrated in FIG. 24B, a contour V-V1-V2 of the book document is spread to V-V1'-V2', wile a contour W-W1-W2 of the book document is spread to W-W1'-W2'. Similarly, FIG. 24C shows how a cross-section PW in FIG. 24A is spread. As illustrated in FIG. 24C, a contour R-R1-R2 of the book document is spread to R-R1'-R2', while a contour S-S1-S2 of the book document is spread to S-S1'-S2'.

At subsequent step S28, the CPU 31 performs a luminance correction. The luminance correction can be made using any of various methods, for example, a method of recovering a density as described in Laid-open Japanese Patent Application No. 11-155070.

At step S29, the CPU 31 corrects the scanned image for blurred characters. The correction for blurred characters can be made using any of various methods, for example, a method of correcting blurred characters as described in Reference 2.

Figure 25:
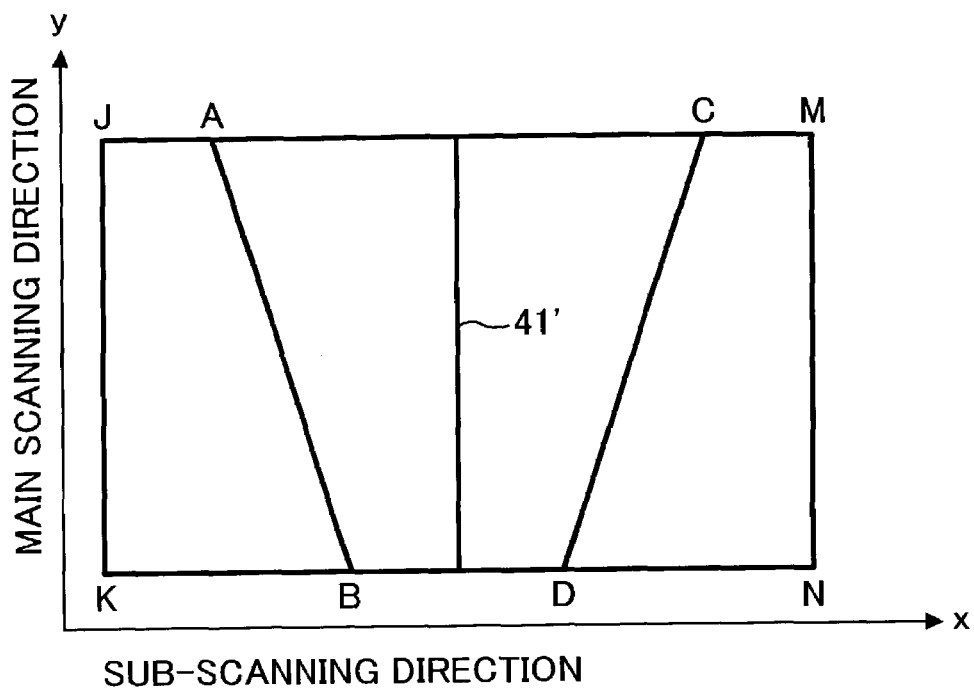
FIG. 25 is a top plan view illustrating an image corrected for the distortion.

The image correction at step S2 is concluded with the blurred character correction at step S29. With the foregoing processing, it is possible to correct the scanned image of the book document for a distortion found near the binding margin 41 and the divergent distortion as illustrated in FIG. 8. FIG. 25 illustrates the scanned image thus corrected.

In summary, the divergent distortion angles α, β on the scanned image are detected using the page contour of the book document located near the upper edge or lower edge of the scanned image in the main scanning direction. The scanned image is corrected for the divergent distortion based on the divergent distortion angles α, β, followed by the correction of the scanned image for the distortion in shape in the sub-scanning direction. It is therefore possible to prevent a deterioration in the image quality associated with the correction for the three-dimensional shape distortion) if performed on a scanned image including such a divergent distortion.

Figure 26:
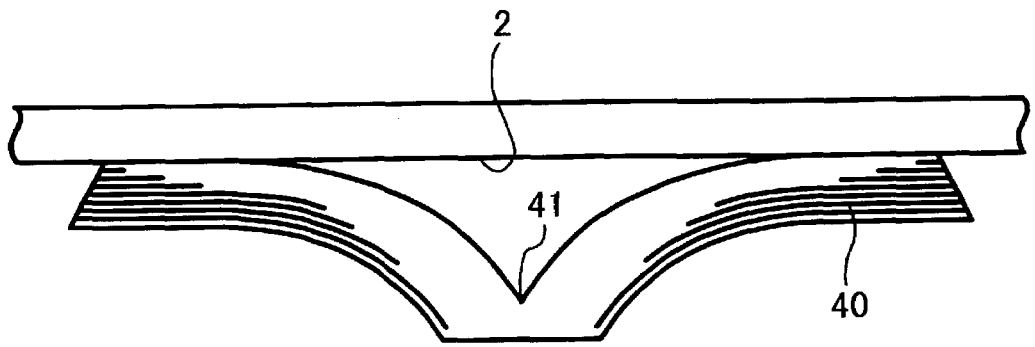
FIG. 26 is a front view illustrating how a book document is in contact with the contact glass.

In the foregoing embodiment, the book document 40, facing downward, is carried on the contact glass 2 such that the binding margin 41 of the book document 40 is substantially in parallel with the main scanning direction of the scanner unit 1. The present invention, however, is not limited to the book document carried on the contact glass 2 in this manner. For example, as illustrated in FIG. 26, a book document 40, facing upward, may be pressed against the contact glass 2 from below the contact glass 2.

While in the foregoing first embodiment, the image reading apparatus is implemented by the scanner unit 1 of the digital copier, the present invention is not limited to this image reading apparatus. For example, the present invention can be applied to a scanner equipped with an automatic page turning function.

Further, in the foregoing first embodiment, the image correcting apparatus is equipped in the digital copier 16, i.e., the image forming apparatus, such that the image correcting apparatus corrects a scanned image read by the scanner unit 1 of the digital copier 16. The present invention, however, is not limited to the disposition of the image correcting apparatus in a digital copier. For example, an image scanner including image reading means for reading a document image may be connected to a personal computer having a similar system configuration to the main control unit 19 illustrated in FIG. 5, and the program stored in the CD-ROM 37, which is a storage medium of the present invention, is installed into a hard disk drive of the personal computer to operate a CPU of the personal computer in accordance with the installed program, thereby implementing the image correcting apparatus which can provide various advantages similar to those described above. Alternatively, the program stored in the CD-ROM 37 may be installed into a hard disk drive of a personal computer having a similar system configuration to the main control unit 19 illustrated in FIG. 5 to operate a CPU of the personal computer in accordance with the installed program, thereby implementing the image correcting apparatus which corrects a scanned image previously read by image reading means.

Next, a second embodiment of the present invention will be described with reference to FIGS. 27 through 28. Parts identical to those in the first embodiment are designated the same reference numerals, and description thereon is omitted. The second embodiment differs from the first embodiment in the correction of a scanned image. Generally, the first embodiment corrects a divergent distortion on a scanned image using a page contour as a linear portion, whereas the second embodiment uses a character string or a rule as the linear portion in correcting a divergent distortion.

Figure 27A:
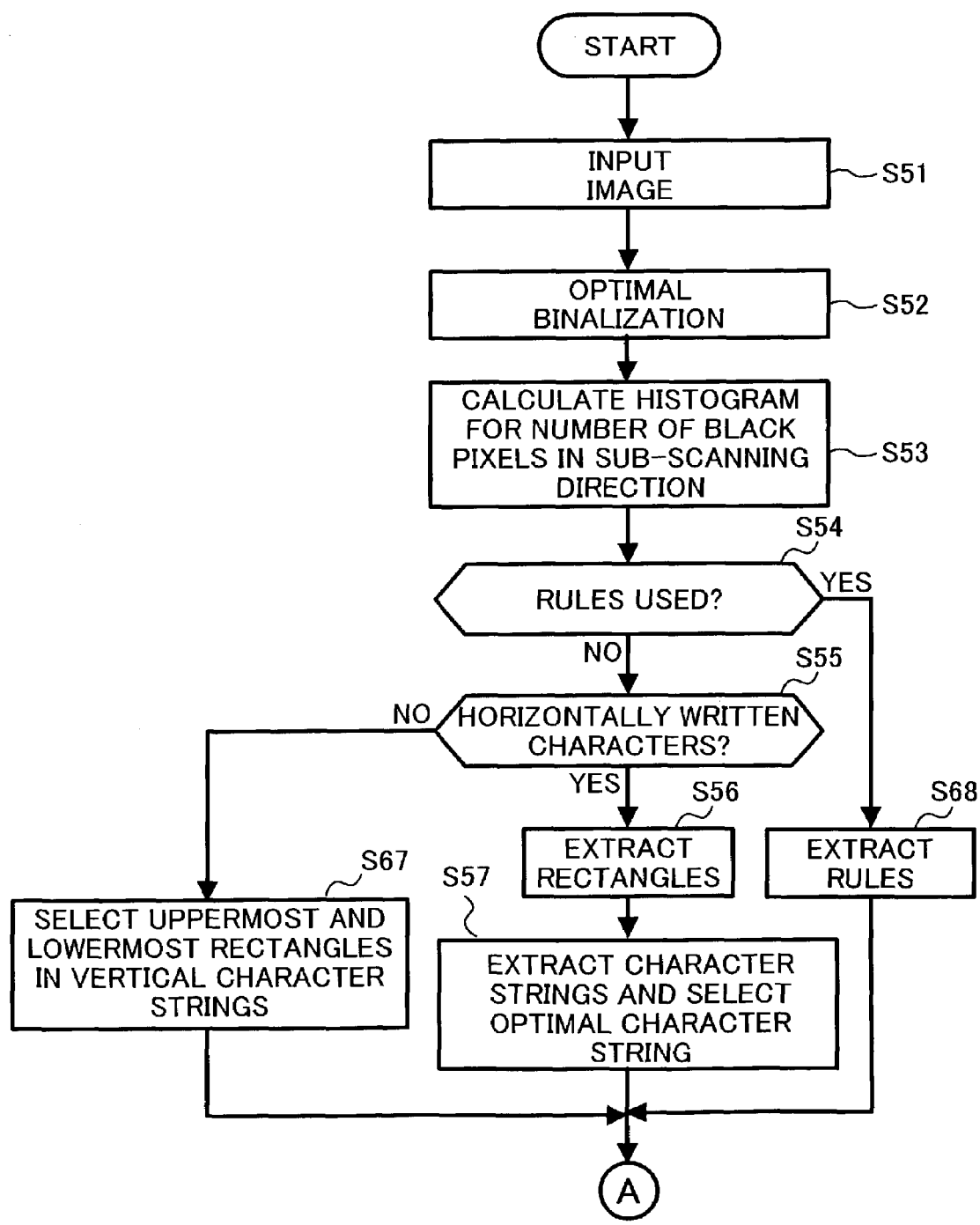
FIG. 27 is a flow chart generally illustrating a procedure for correcting a scanned image in a second embodiment of the present invention.
Figure 27B:
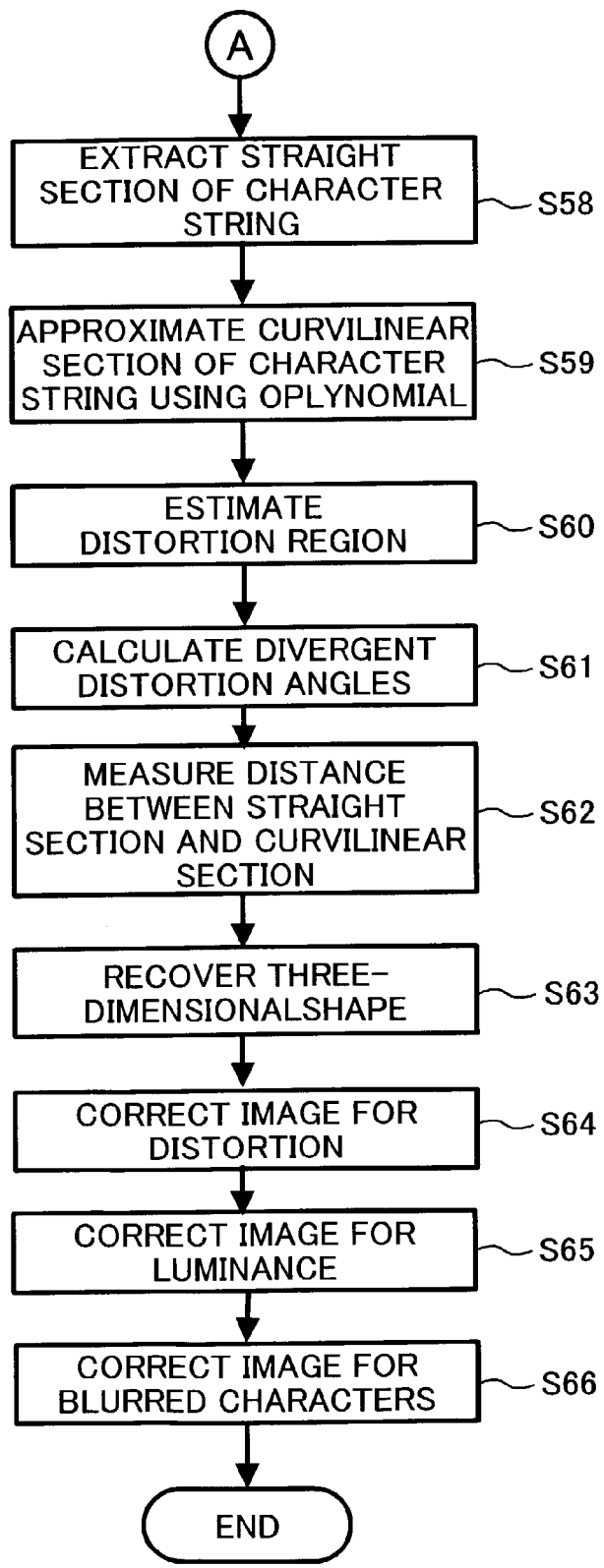
Figure 28:
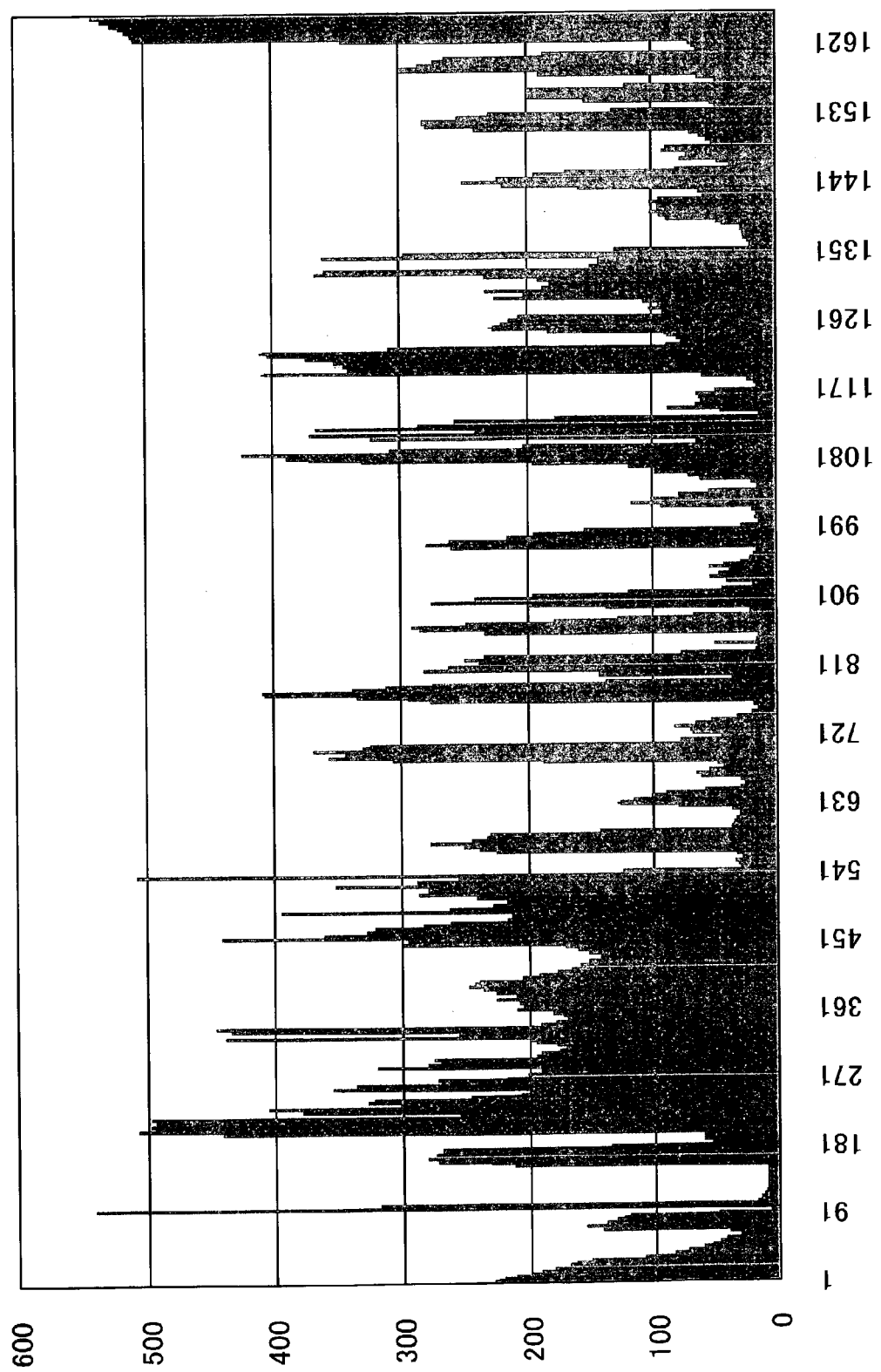
FIG. 28 is a diagram showing an exemplary histogram for black pixels on the image.

FIG. 27 is a flow chart generally illustrating a procedure for correcting a scanned image.

First, a scanned image of a book document 40 carried on the contact glass 2 is output from the image data processing unit 28 to the main control unit 19 (step S51), followed by optimal binarization for the scanned image of the book document 40 (step S52), and calculation of a histogram for the number of black pixels in the sub-scanning direction (step S53). FIG. 28 shows an exemplary histogram for black pixels on the image.

Next, at step S54, the CPU 31 waits for an instruction from the operator to correct the image using character information or rule information.

When the operator instructs the CPU 31 to utilize character information in the image correction through the operation panel 22 or the like (N at step S54), the flow proceeds to step S55, where it is determined whether characters are written horizontally or vertically. The determination as to whether characters are written horizontally or vertically is made based on the histogram for the number of black pixels in the horizontal direction (sub-scanning direction), calculated at step S53. For example, an image of horizontally written characters results in a pattern of peaks and valleys repeated in the histogram, whereas such a pattern is not generated from an image of vertically written characters. This feature is used to determine whether characters are written horizontally or vertically.

Figures 29, 30:
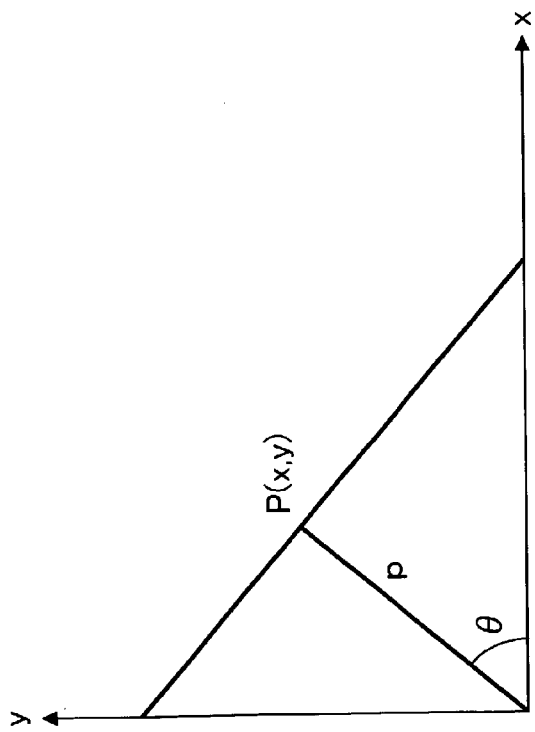
FIG. 29 is an explanatory diagram showing an exemplary result of character circumscribing rectangle extraction and character string extraction performed on a binarized scanned image.
FIG. 30 is an explanatory diagram showing the principles of Hough transform.

When it is determined that the characters are written horizontally (Y at step S55), the CPU 31 extracts rectangles in units of characters in which black pixels are connected in succession (step S56), and extracts character strings for selecting an appropriate reference character string (step S57). Since the character recognition is a known technique, description thereon is omitted. FIG. 29 illustrates exemplary results of extracting character circumscribing rectangles and extracting a character string from a binarized scanned image. While a large number of character strings are available after the character circumscribing rectangle extraction and character string extraction, character strings having a predetermined length or more are selected from the resulting character strings, and the character string having the largest amount of curvature is again selected from those having the predetermined length or more as an optimal reference character string. The character string having the predetermined length or more is assumed to be a character string which is longer than 80% of the longest character string. In addition, the CPU 31 selects one character string on each of the left and right sides of the boundary in the binding margin 41 of the book document. The amount of curvature is measured by a position in the main scanning direction of the center coordinates of each of character circumscribing rectangles included in a character string.

The amount of curvature is regarded larger as a larger difference is present between a maximum and a minimum of the center coordinates.

Subsequently, the CPU 31 extracts a straight section of the reference character string extracted at step S57 (step S58). The extraction of the straight section from the reference character string is based on a Hough transform of the center coordinate values of each rectangle.

Figure 31:
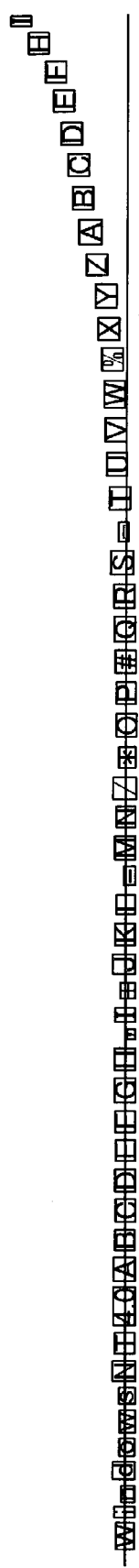
FIG. 31 is an explanatory diagram showing the result of extracting a straight section in FIG. 29 in accordance with a Hough transform.

The principles of the Hough transform are shown below. As illustrated in FIG. 30, a line passing a point P(x,y) on an image satisfies the following equation (8):

$$\rho = x \cdot \cos\theta + y \cdot \sin\theta \tag{8}$$

where (x, y) is the coordinates of the point P, $\rho$ is the distance from the origin o to point P, and $\theta$ is the angle formed by a line PO with the x-axis. The rectangle center coordinates (xi, yi) are projected onto a discrete (meshed) ($\rho$, $\theta$) parameter plane. A point on the (x, y) plane is projected to a curve on the ($\rho$, $\theta$) plane. The number of passing curves is counted for each of meshes on the plane. The result of counting shows that a mesh having a large number of passing curves has a corresponding straight line. Since one character string has only one straight line, the straight line can be extracted by finding the mesh through which the largest number of curves pass. This method is highly resistant to noise, and can extract a straight line even from a mixture of a straight line and a curve. FIG. 31 shows the result of extracting a straight section in FIG. 29.

Figure 32:
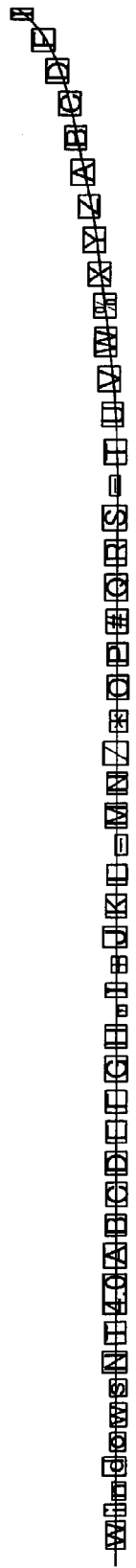
FIG. 32 is an explanatory diagram showing the result of extracting a curvilinear section in FIG. 29 in accordance with a least square method.

Subsequently, the CPU 31 acquires a curvilinear section of the reference character string (step S59). The reference character string extracted at step S57 is approximated by the polynomial (9) shown below, and coefficients of the polynomial are found through a least square method. In other words, step S59 approximates the curvilinear section of the character string using the polynomial:

$$y = a_0 + a_1 x^1 + a_2 x^2 + \ldots a_n x^n \tag{9}$$

where (x, y) is the coordinates of the center of a character rectangle, and ($a_0$, $a_1$, $a_2$, . . . , $a_n$) are coefficients of the polynomial. FIG. 32 shows the resulting curvilinear section extracted at step 59.

Next, the CPU 31 detects the boundary point between the straight section and curvilinear section of the reference character string, and estimates a distortion region in the scanned image (step S60). A variety of methods can be used to determine the boundary point between the straight section and curvilinear section of the reference character string. For example, the approach described in Reference 2 can be used. Generally, an approximate straight section is found from the extracted reference character string, and a point of the straight section from which a curve begins is determined as the boundary point between the straight section and curvilinear section of the reference character string.

At subsequent step S61, the CPU 31 calculates the angle (divergent distortion angle) formed by the straight section of the reference character string to the horizontal line in the horizontal direction (sub-scanning direction) on each of the left and right pages of the scanned image. See the first embodiment for description on how the slope of the line segment is calculated.

Figure 33:
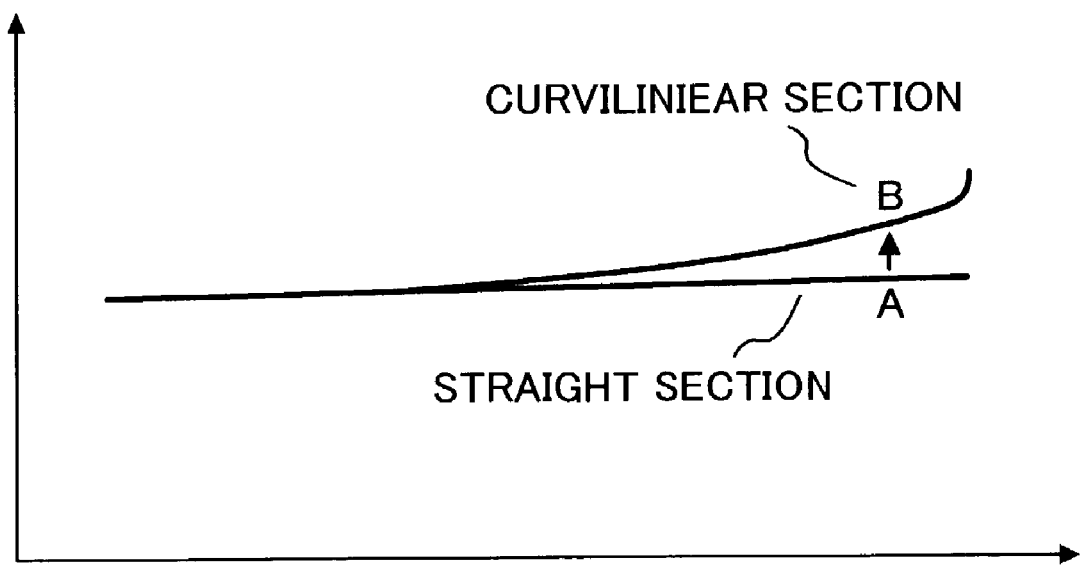
FIG. 33 is an explanatory diagram showing the distance from a straight section of a reference character string to a curvilinear section of the reference character string.

Next, the CPU 31 measures the distance between the straight section of the reference character string found at step S58 and the curvilinear section of the reference character string found at step 59 (step S62), and recovers the three-dimensional shape (step S63). FIG. 33 shows the distance between the straight section and curvilinear section of the reference character string.

Figure 34:
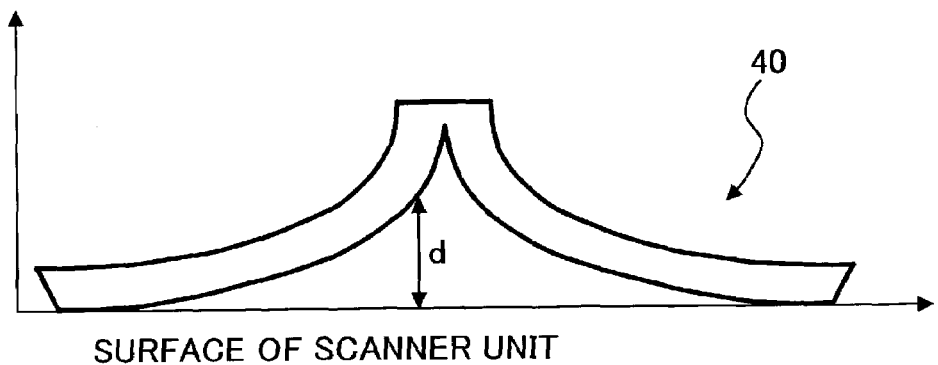
FIG. 34 is an explanatory diagram showing a level to which a book rises above the contact glass.
Figure 35:
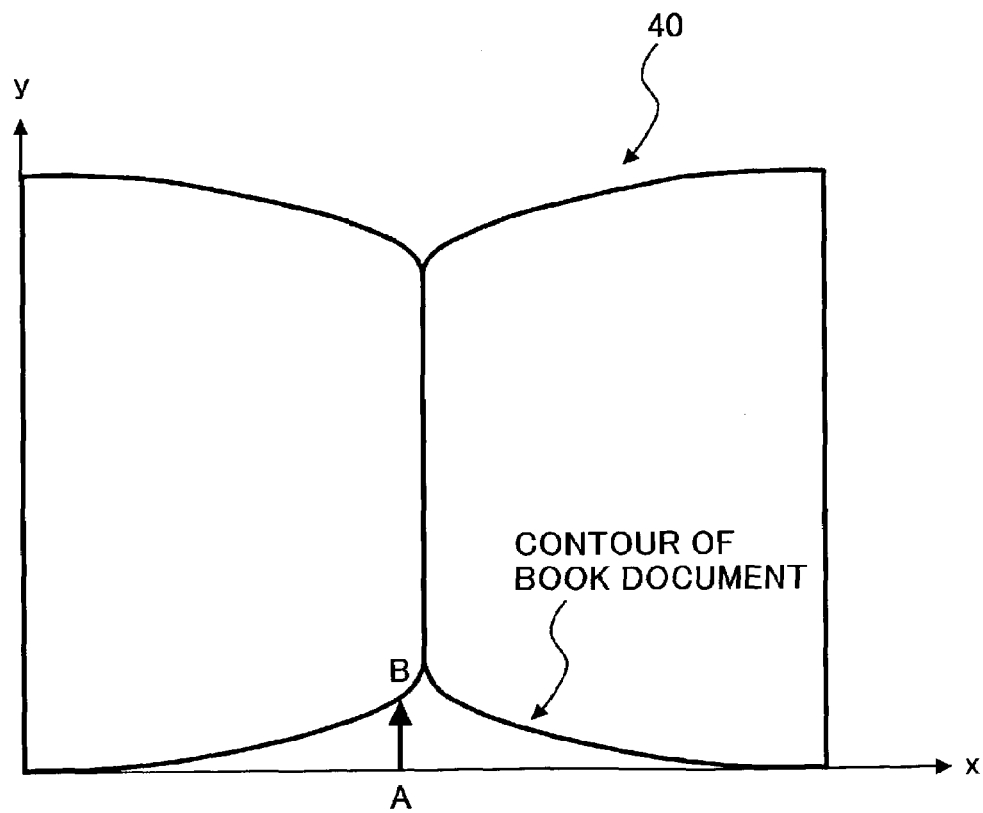
FIG. 35 is an explanatory diagram showing an amount by which an image is contracted.

When the main scanning direction is in parallel with the boundary in the binding margin 41 of the book document 40, the focusing system has the following characteristics when the book document 40 is read using the scanner lens such as the lens unit 10. The main scanning direction is associated with central projection, while the sub-scanning direction with stereographic projection. The three dimensional shape is recovered taking advantage of these characteristics. In the central projection, the book document 40 rises above the contact glass 2, as illustrated in FIGS. 34 and 35, to cause a long focusing distance and a smaller enlargement scaling factor of the image, so that the straight outer edge gradually curves toward the inside. With a measurement of a contraction amount AB in FIG. 35, a height d of the book document 40, rising above the contact glass 2 as illustrated in FIG. 34, can be calculated. Thus, the three-dimensional shape (the amount by which the book document 40 rises above the contact glass 2) can be recovered by measuring a distortion of the straight section toward the inside.

Figure 36:
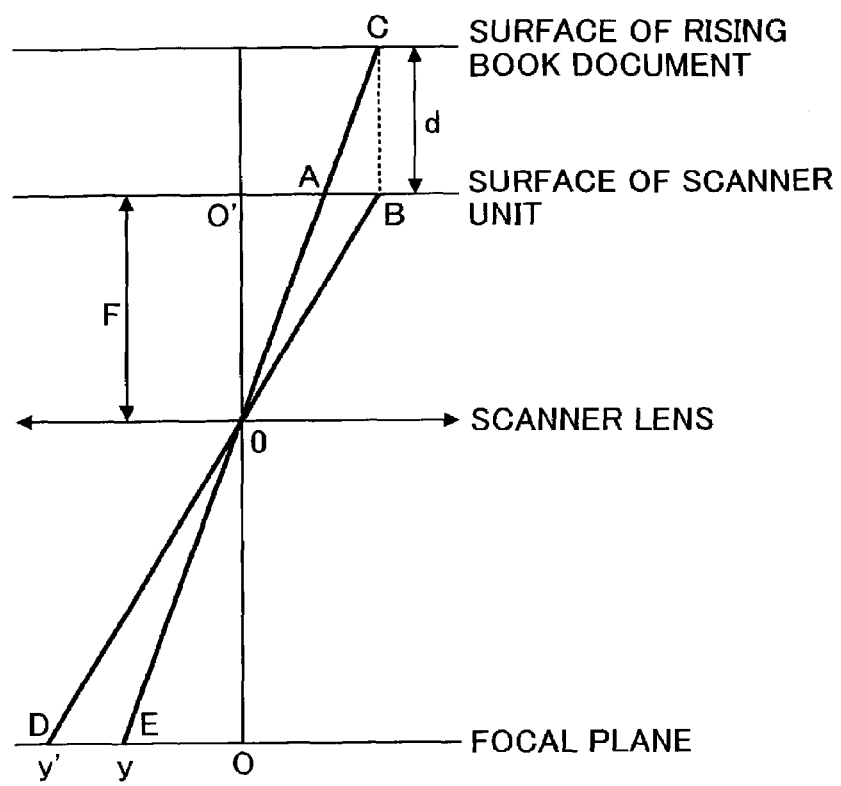
FIG. 36 is an explanatory diagram showing how a scanner lens focuses a scanned image.

Assume herein that the book document is horizontally placed on the contact glass 2. In this event, the resulting three-dimensional shape appears to be two-dimensional. FIG. 36 shows how the scanner lens focuses a scanned image, wherein OO' is the optical axis of the lens, and 0 is the center of the lens. The distance F from the center 0 of the lens to the surface of the scanner unit (contact glass 2) is referred to as a focal distance of the scanner unit. A point B on the surface of the scanner unit is focused at D on the focal plane. A point C on the rising book (book document 40) is focused at E on the focal plane. The distances from the respective points to the center 0 of the focal plane are designated by y, y', respectively (While the center 0 is moved as the movable exposure unit 5 and movable reflector unit 8 are moved in the sub-scanning direction, the trace is referred to as a focusing center line). The following equations (10), (11) are derived from the similarity principles of triangles.

$$d/F = AB/AO' \quad (10)$$

$$AB/AO' = (y-y')/y' \quad (11)$$

Also, from the equations (10), (11), the rising amount d of the book document 40 is calculated by the following equation (12):

$$d = F \times ((y-y')/y) \quad (12)$$

It can be seen that the three-dimensional shape is found from a two-dimensional distortion amount by the equation (12). In this event, while the distortion amount (y'−y) and distance y can be measured in the image, the second embodiment calculates them from the distance between a straight section and a curvilinear section of a character string or a rule. The focal distance F of the lens is a known amount determined by the scanner unit 1, and represented by a set value of the scanner unit 1 or a calibration value of the lens.

Subsequently, the CPU 31 corrects the scanned image for the distortion based on the three-dimensional shape (step S64), corrects the scanned image for the luminance (step S65), and corrects the image for blurred characters thereon (step S66).

Since the correction of the image for the distortion at step S64 is identical to that performed at steps S25-S27 described in the first embodiment, description thereon is omitted.

Likewise, since the correction of the image for the luminance (step S65) and the correction of the image for blurred characters are identical to those performed at steps S28 and S29 in the first embodiment, description thereon is omitted.

Figure 37:
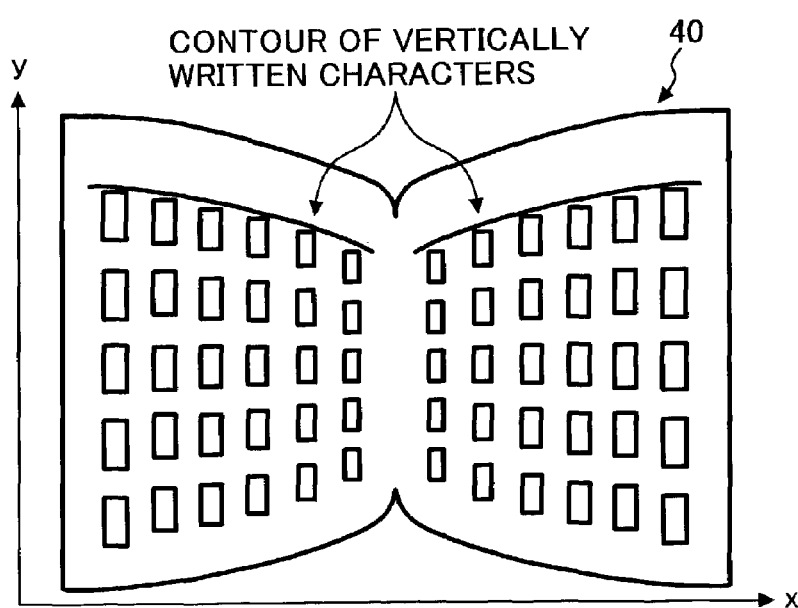
FIG. 37 is an explanatory diagram illustrating a reference character string for vertically written characters.

On the other hand, when it is determined that the characters are written vertically (N at step S55), the flow proceeds to step S67, where the CPU 31 extracts rectangles and character strings in the vertical direction. At step S67, the CPU 31 extracts the uppermost or lowermost rectangles, and uses the sequence of extracted rectangles as a reference character string for detecting the contour of the vertically written characters, as illustrated in FIG. 37.

At subsequent steps S58-S66, the CPU 31 corrects the image for the distortion using the coordinates of the center of each of the rectangles which make up the reference character string.

Figure 38:
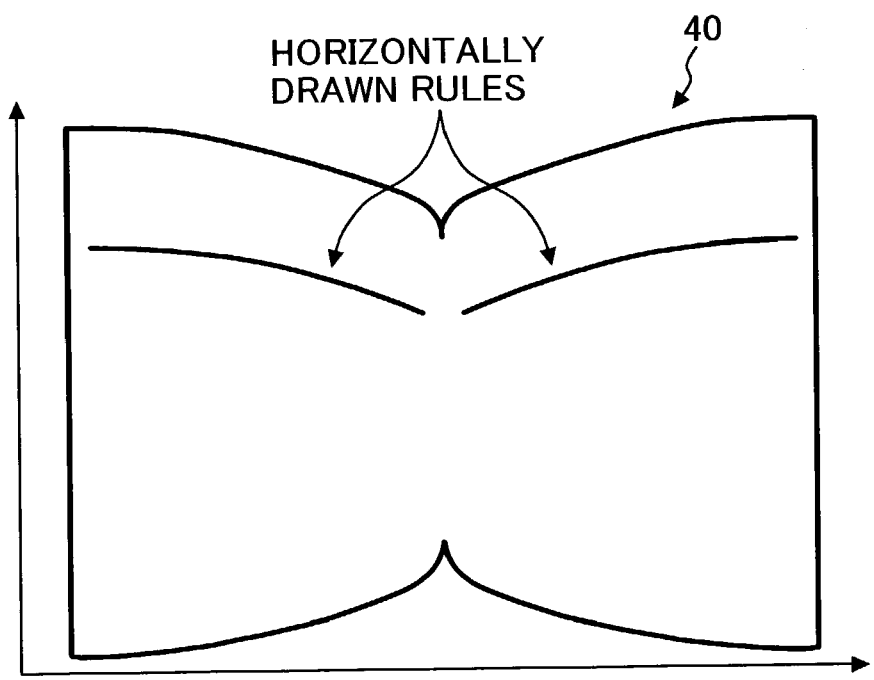
FIG. 38 is an explanatory diagram illustrating a rule drawn in the horizontal direction.
Figure 39:
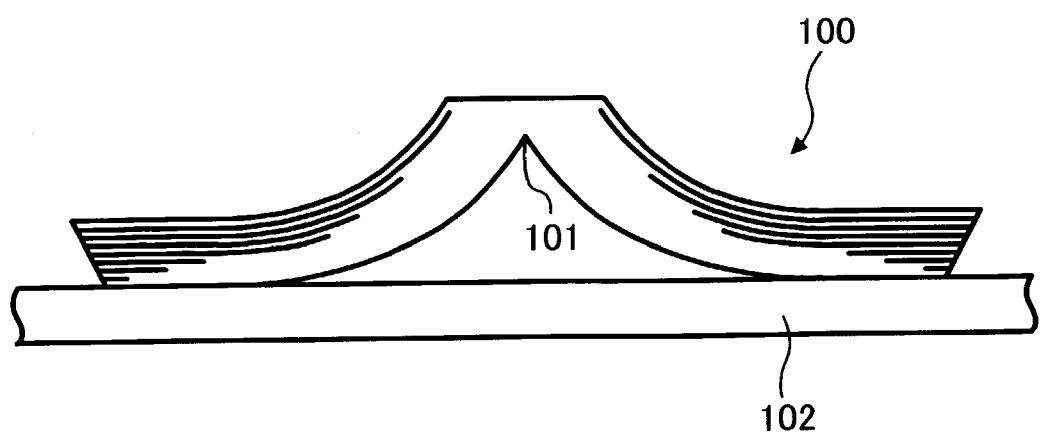
FIG. 39 is a front view illustrating how a book document is carried on a contact glass.
Figure 40:
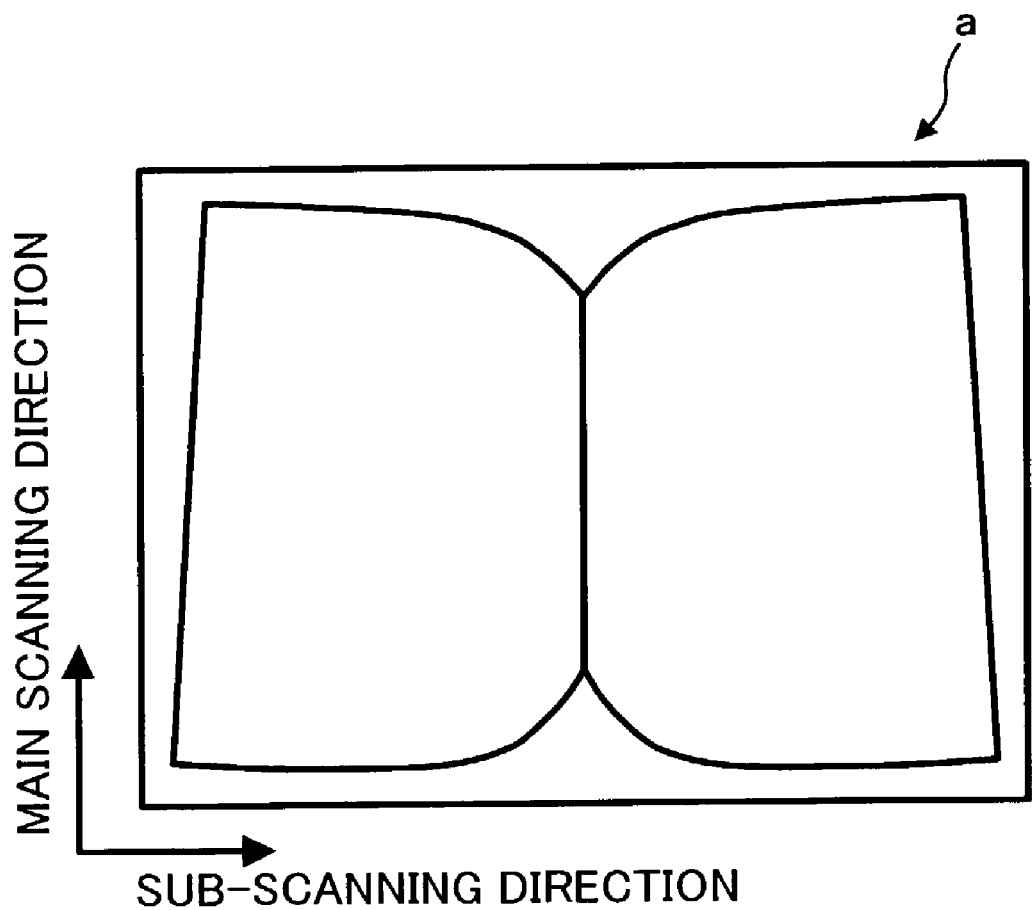
FIG. 40 is an explanatory diagram illustrating a scanned image which suffers from a divergent distortion.

When the operator instructs the CPU 31 to utilize rule information in the distortion correction through the operation panel 22 (Y at step S54), the CPU 31 extracts rules drawn in the horizontal direction (sub-scanning direction) (step S68). At step S68, the CPU 31 uses the histogram for the number of black pixels in the horizontal direction, calculated at step S53. A rule drawn in the horizontal direction as illustrated in FIG. 38 causes a thin and high peak to appear in the histogram. Taking advantage of this fact, rules are extracted for selecting those having a predetermined length or more therefrom. For specifying the predetermined length, the selection is made for those rules which are longer than 80% of the longest rule. Then, the CPU 31 selects the rule closest to the upper or lower edge of the image from the selected rules for use as a reference rule. In addition, the CPU 31 selects one rule on each of the left and right sides of the boundary in the binding margin 41 of the book document 40.

Since subsequent steps S58-S66 are basically similar to those performed when character information is used, description thereon is omitted.

Although the invention has been described with respect to specific embodiments for a complete and clear disclosure, the appended claims are not to be thus limited but are to be construed as embodying all modifications and alternative constructions that may occur to one skilled in the art which fairly fall within the basic teaching herein set forth.

This invention may be conveniently implemented using a conventional general purpose digital computer programmed according to the teaching of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent applications, No. JPAP2002-033092 filed on Feb. 8, 2002 and No. 2002-330362 filed on Nov. 14, 2002 in the Japanese Patent Office, the entire contents of which are incorporated by reference herein.

What is claimed is:

1. An image correcting apparatus for correcting a scanned image of a book document read by image reading means through a contact glass while said book document is in contact with said contact glass, said apparatus comprising:

divergent angle detecting means for detecting a divergent angle of said scanned image using a linear portion included in said scanned image of said book document; and divergent distortion correcting means for correcting said scanned image for a divergent distortion based on said divergent distortion angle detected by said divergent distortion angle detecting means and subsequently correcting said scanned image for a shape distortion in a sub-scanning direction.

2. An image correcting apparatus according to claim 1, wherein said divergent distortion correcting means comprises:

three-dimensional shape detecting means for detecting a three-dimensional shape of said book document;

main scanning direction distortion correcting means for spreading said scanned image in a main scanning direction based on the three-dimensional shape of said book document detected by said three-dimensional shape detecting means;

image rotating means for dividing said scanned image spread by said main scanning direction distortion correcting means into a left and a right page, and rotating the left and right pages respectively about predetermined positions by said divergent distortion angles detected by said divergent distortion angle detecting means; and sub-scanning direction distortion correcting means for spreading said left and right pages in the sub-scanning direction based on the three-dimensional shape of said images rotated by said image rotating means.

3. An image correcting apparatus according to claim 2, wherein said main scanning direction distortion correcting means spreads said scanned image in the main scanning direction based on an spreading rate for each pixel detected with reference to an optical axis of said image reading means.

4. An image correcting apparatus according to claim 2, wherein said three-dimensional shape detecting means comprises:

rising level detecting means for detecting a rising level of said book document from said contact glass based on the distance from a line extended from said straight sections on the left and right pages of said scanned image to a boundary in a binding margin to said curvilinear section of said linear portion; and linear interpolating means for selecting two rising levels for each column on lines parallel with said boundary in the binding margin to perform linear interpolation for each column on said lines based on said two rising levels.

5. An image correcting apparatus according to claim 4, wherein said rising level detecting means estimates a boundary between said distortion region in which said book document rises over said contact glass and a region out of said distortion region, and sets the rising level at the boundary to zero.

6. An image correcting apparatus according to claim 1, wherein said divergent distortion correcting means comprises pixel linear interpolating means for performing linear interpolation based on pixel values of four adjoining blocks for each pixel value of said scanned image rotated by said image rotating means.

7. An image correcting apparatus according to claim 1, further comprising luminance correcting means for correcting said scanned image for a luminance.

8. An image correcting apparatus according to claim 1, further comprising a blur correcting means for correcting said scanned image for blurs.

9. An image reading apparatus comprising:

a contact glass;

image reading means for reading a document image through said contact glass while said document image is in contact with said contact glass; and an image correcting apparatus according to any of claims 1 to 8 for correcting a scanned image read by said image reading means.

10. A computer readable medium encoded with a program for causing a computer to correct a scanned image of a book document read by image reading means through a contact glass while said book document is in contact with said contact glass, said program causing said computer to execute:

a divergent angle detecting function for detecting a divergent angle of said scanned image using a linear portion included in said scanned image of said book document; and a divergent distortion correcting function for correcting said scanned image for a divergent distortion based on said divergent distortion angle detected by said divergent distortion angle detecting function and subsequently correcting said scanned image for a shape distortion in a sub-scanning direction.

11. A computer readable medium encoded with a program according to claim 10, wherein said divergent distortion correcting function executed by said computer includes:

a three-dimensional shape detecting function for detecting a three-dimensional shape of said book document;

a main scanning direction distortion correcting function for spreading said scanned image in a main scanning direction based on the three-dimensional shape of said book document detected by said three-dimensional shape detecting function;

an image rotating function for dividing said scanned image spread by said main scanning direction distortion correcting function into a left and a right page, and rotating the left and right pages respectively about predetermined positions by said divergent distortion angles detected by said divergent distortion angle detecting function; and a sub-scanning direction distortion correcting function for spreading said left and right pages in the sub-scanning direction based on the three-dimensional shape of said images rotated by said image rotating function.

12. An image correcting method for correcting a scanned image of a book document read by image reading means, said method comprising the steps of:

obtaining a scanned image of said book document scanned through a contact glass while said book document is in contact with said contact glass;

detecting a divergent angle of said scanned image using a linear portion included in said scanned image of said book document; and correcting said scanned image for a divergent distortion based on said divergent distortion angle detected by said divergent distortion angle detecting step and subsequently correcting said scanned image for a shape distortion in a sub-scanning direction.

13. An image correcting method according to claim 12, wherein said divergent distortion correcting step comprises the steps of:

detecting a three-dimensional shape of said book document;

spreading said scanned image in a main scanning direction based on the three-dimensional shape of said book document detected by said three-dimensional shape detecting step;

dividing said scanned image spread by said main scanning direction distortion correcting step into a left and a right page, and rotating the left and right pages respectively about predetermined positions by said divergent distortion angles detected by said divergent distortion angle detecting step; and spreading said left and right pages in the sub-scanning direction based on the three-dimensional shape of said images rotated by said image rotating step.

14. An image correcting apparatus for correcting a scanned image of a book document read by a scanner through a contact glass while said book document is in contact with said contact glass of the scanner, said apparatus comprising:

a divergent angle detector configured to detect a divergent angle of said scanned image using a linear portion included in said scanned image of said book document; and a divergent distortion corrector configured to correct said scanned image for a divergent distortion based on said divergent distortion angle detected by said divergent distortion angle detecting means and subsequently correcting said scanned image for a shape distortion in a sub-scanning direction.

15. An image correcting apparatus according to claim 14, wherein said divergent distortion corrector comprises:

a three-dimensional shape detector configured to detect a three-dimensional shape of said book document;

a main scanning direction distortion corrector configured to spread said scanned image in a main scanning direction based on the three-dimensional shape of said book document detected by said three-dimensional shape detector;

an image rotating mechanism configured to divide said scanned image spread by said main scanning direction distortion corrector into a left and a right page, and to rotate the left and right pages respectively about predetermined positions by said divergent distortion angles detected by said divergent distortion angle detector; and a sub-scanning direction distortion corrector configured to spread said left and right pages in the sub-scanning direction based on the three-dimensional shape of said images rotated by said image rotating mechanism.

16. An image correcting apparatus according to claim 15, wherein said main scanning direction distortion corrector spreads said scanned image in the main scanning direction based on an spreading rate for each pixel detected with reference to an optical axis of said scanner.

17. An image correcting apparatus according to claim 14, wherein said three-dimensional shape detector comprises:

a rising level detector configured to detect a rising level of said book document from said contact glass based on the distance from a line extended from said straight sections on the left and right pages of said scanned image to a boundary in a binding margin to said curvilinear section of said linear portion; and a linear interpolating mechanism configured to select two rising levels for each column on lines parallel with said boundary in the binding margin to perform linear interpolation for each column on said lines based on said two rising levels.

18. An image correcting apparatus according to claim 17, wherein said rising level detector estimates a boundary between said distortion region in which said book document rises over said contact glass and a region out of said distortion region, and sets the rising level at the boundary to zero.

19. An image correcting apparatus according to claim 14, wherein said divergent distortion corrector comprises a pixel linear interpolating mechanism configured to perform linear interpolation based on pixel values of four adjoining blocks for each pixel value of said scanned image rotated by said image rotating mechanism.

20. An image correcting apparatus according to claim 14, further comprising a luminance corrector configured to correct said scanned image for a luminance.

21. An image correcting apparatus according to claim 14, further comprising a blur corrector configured to correct said scanned image for blurs.

22. An image reading apparatus comprising:

a contact glass;

a scanner configured to read a document image through said contact glass while said document image is in contact with said contact glass; and the image correcting apparatus according to any of claims 14 to 21 for correcting a scanned image read by said scanner.

23. An image forming apparatus comprising:

a contact glass a scanner configured to read a document image through said contact glass while said document image is in contact with said contact glass;

the image correcting apparatus according to any of claims 14 to 21 for correcting a scanned image read by said scanner; and an image printer configured to print an image on a sheet based on image data output from said image correcting apparatus.

* * * * *